US012784120B2

(12) United States Patent
Addy et al.

(10) Patent No.: US 12,784,120 B2

(45) Date of Patent: Nov. 3, 2026

(54) ADAPTIVE MISSION STRATEGY OPTIMIZATION THROUGH AI-GENERATED AMBIENT RECOMMENDATIONS FOR TACTICAL COMMAND

(71) Applicant: GovernmentGPT, Inc., Mountain View, CA (US)

(72) Inventors: Fred Addy, Palo Alto, CA (US); Giacomo Sacca, Allentown, NJ (US); Raj Abhyanker, Mountain View, CA (US)

( * ) Notice: Subject to any disclaimer, the term of this patent is extended or adjusted under 35 U.S.C. 154(b) by 147 days.

(21) Appl. No.: 18/904,097

(22) Filed: Oct. 2, 2024

(65) Prior Publication Data

US 2025/0209557 A1 Jun. 26, 2025

Related U.S. Application Data

(63) Continuation-in-part of application No. 18/437,200, filed on Feb. 8, 2024, now Pat. No. 12,299,557.

(Continued)

(51) Int. Cl.

*G10L 15/26* (2006.01)
*G06Q 50/26* (2012.01)

(Continued)

(52) U.S. Cl.

CPC ........... *G06Q 50/265* (2013.01); *G06V 10/82* (2022.01); *G06V 20/17* (2022.01); *G06V 20/52* (2022.01);

(Continued)

(58) Field of Classification Search

USPC ................ 704/231, 246, 247, 251, 252, 275

See application file for complete search history.

(56) References Cited

U.S. PATENT DOCUMENTS

| | | | |
|---|---|---|---|
| 5,864,481 | A | 1/1999 | Gross et al. |
| 6,388,422 | B1 | 5/2002 | Lew |

(Continued)

FOREIGN PATENT DOCUMENTS

| | | | |
|---|---|---|---|
| CN | 204291090 | U | 4/2015 |
| CN | 107533838 | B | 12/2020 |

(Continued)

OTHER PUBLICATIONS

"The Design And Requirements Evolution Of A Speech Recognition Technology For Tactical Applications And Environments", By Mr. Lockwood Reed, Published online in [Dec 2004] https://apps.dtic.mil/sti/tr/pdf/ADA432741.pdf.

(Continued)

*Primary Examiner* — Leonard Saint-Cyr

(74) *Attorney, Agent, or Firm* — LeaglForce RAPC Worldwide

(57) ABSTRACT

Disclosed are a method, system, and apparatus of adaptive mission strategy optimization through ai-generated ambient recommendations for tactical command. According to one embodiment, the method includes simultaneously listening to multiple communications surrounding a wearer, amplifying a human speech detected in the multiple communications through a wearable microphone, and using an artificial intelligence model to generate a tactical recommendation to the wearer through a mobile device accessible to the wearer.

18 Claims, 16 Drawing Sheets

Related U.S. Application Data

(60) Provisional application No. 63/554,360, filed on Feb. 16, 2024, provisional application No. 63/626,075, filed on Jan. 29, 2024, provisional application No. 63/614,022, filed on Dec. 22, 2023.

(51) Int. Cl.

| | |
|---|---|
| ***G06V 10/82*** | (2022.01) |
| ***G06V 20/17*** | (2022.01) |
| ***G06V 20/52*** | (2022.01) |
| ***G10K 11/178*** | (2006.01) |
| ***G10L 21/0208*** | (2013.01) |
| ***H04R 1/32*** | (2006.01) |
| ***H04W 4/029*** | (2018.01) |
| *G10L 21/0216* | (2013.01) |

(52) U.S. Cl.

CPC ........ *G10K 11/17837* (2018.01); *G10L 15/26* (2013.01); *G10L 21/0208* (2013.01); *H04R 1/326* (2013.01); *H04W 4/029* (2018.02); *G10K 2210/1082* (2013.01); *G10L 2021/02087* (2013.01); *G10L 2021/02166* (2013.01)

(56) References Cited

U.S. PATENT DOCUMENTS

| | | | | |
|---|---|---|---|---|
| 6,784,833 | B1 | 8/2004 | Evans | |
| 7,486,798 | B2 | 2/2009 | Anjanappa et al. | |
| 7,707,035 | B2 | 4/2010 | McCune | |
| 7,930,181 | B1 | 4/2011 | Goffin et al. | |
| 8,020,104 | B2 | 9/2011 | Robarts et al. | |
| 8,385,560 | B2 | 2/2013 | Solbeck et al. | |
| 8,581,710 | B2 | 11/2013 | Heubel et al. | |
| 8,755,839 | B2 | 6/2014 | Parkulo et al. | |
| 8,952,889 | B2 | 2/2015 | Jacobsen et al. | |
| 9,223,494 | B1 | 12/2015 | DeSalvo et al. | |
| 9,380,374 | B2 | 6/2016 | Sprague et al. | |
| 9,628,756 | B2 | 4/2017 | Edwards | |
| 10,044,857 | B2 | 8/2018 | Philbin | |
| 10,079,929 | B2 | 9/2018 | Lord et al. | |
| 10,102,732 | B2 | 10/2018 | Gersten | |
| 10,257,434 | B2 | 4/2019 | Arnold | |
| 10,379,386 | B2 | 8/2019 | Fan | |
| 10,410,634 | B2 | 9/2019 | Masaki et al. | |
| 10,425,717 | B2 | 9/2019 | Angel, Jr. | |
| 10,440,459 | B2 | 10/2019 | Smith et al. | |
| 10,507,137 | B2 | 12/2019 | Dierenbach | |
| 10,803,863 | B2 | 10/2020 | Ro et al. | |
| 10,878,824 | B2 | 12/2020 | Carpenter et al. | |
| 10,964,339 | B2 | 3/2021 | Mortensen et al. | |
| 11,289,074 | B2 | 3/2022 | Lee | |
| 11,455,792 | B2 | 9/2022 | Maeng et al. | |
| 11,689,846 | B2 | 6/2023 | Benattar | |
| 2012/0194420 | A1* | 8/2012 | Osterhout | G06F 3/013 345/156 |
| 2012/0194549 | A1* | 8/2012 | Osterhout | G06Q 30/02 345/633 |
| 2012/0206322 | A1* | 8/2012 | Osterhout | G06F 3/005 345/8 |
| 2016/0209648 | A1* | 7/2016 | Haddick | G04G 21/025 |
| 2017/0330565 | A1 | 11/2017 | Daley et al. | |
| 2019/0248391 | A1 | 8/2019 | Preston et al. | |
| 2021/0289174 | A1 | 9/2021 | Thiel et al. | |
| 2023/0073359 | A1 | 3/2023 | Kukuk | |
| 2024/0099934 | A1 | 3/2024 | Stanfield et al. | |
| 2024/0267719 | A1 | 8/2024 | Pellegrini et al. | |
| 2024/0314378 | A1* | 9/2024 | Hou | H04N 21/2668 |

FOREIGN PATENT DOCUMENTS

| | | | |
|---|---|---|---|
| JP | 6420769 | B2 | 11/2018 |
| KR | 102675809 | B1 | 6/2024 |
| KR | 102696200 | B1 | 8/2024 |
| WO | 2007133814 | A2 | 11/2007 |

OTHER PUBLICATIONS

"The Requirements and Applications of Speech Recognition Technology for Voice Activated Command and Control in the Tactical Military Environment", By Mr. Lockwood Reed, Published Online in [Jun. 2004] https://typeset.io/pdf/the-requirements-and-applications-of-speech-recognition-57mz9s24ys.pdf.

"Military Applications of Speech Understanding Systems", By R. Turn et al., Published Online On [Jun. 1, 1974] https://apps.dtic.mil/sti/tr/pdf/AD0787394.pdf.

"An Evaluation of a Spoken Language Interface", By Paula P. Henry et al., Published Online in [Apr. 2005] https://apps.dtic.mil/sti/pdfs/ADA432271.pdf.

"Enhancing Communication in Noisy Environments", By Craig Burrel et al., Found Online on [Nov. 21, 2024] https://apps.dtic.mil/sti/tr/pdf/ADA567868.pdf.

"Speech Intelligibility in Noise Using Throat and Acoustic Microphones", By Barbara E. Acker-Mills et al., Published at Aviation Space and Environmental Medicine, Published Online in [Feb. 2006] https://apps.dtic.mil/sti/tr/pdf/ADA422522.pdf.

"Opportunities for Advanced Speech Processing in Military Computer-Based Systems", By Clifford J. Weinstein, Published at Proceedings of the IEEE, Published Online on [Aug. 6, 2002] https://aclanthology.org/H90-1103.pdf.

"Military Applications Of Automatic Speech Recognition & Future Requirements", By Dr. Bruno Seek et al., Published at NADC, Proceedings: Voice Technology for Interactive Real-Time Command(Control Systems Application, Published Online on [Jan. 1, 1977] https://ntrs.nasa.gov/api/citations/19930075175/downloads/19930075175.pdf.

"Use of Speech and Language Technology in Military Environments", By Dr. Stephane Pigeon et al., Published Online in [Jan. 2005] https://stephanepigeon.com/Docs/TR-IST-037-ALL.pdf.

"TVIS: Tactical Voice Interaction Services for Dismounted Urban Operations", By Thomas Massie et al., Published at MILCOM 2008—2008 IEEE Military Communications Conference, Published Online on [Jan. 19, 2009] https://citeseerx.ist.psu.edu/document?repid=rep1&type=pdf&doi=379020751f88da9168c60fdb3531e0b389f922b2.

"Speech Recognition by Machine: A Review", BY M.A.Anusuya et al., Published at (IJCSIS) International Journal of Computer Science and Information Security, vol. 6, No. 3, 2009, Published Online in [Jan. 2010] https://arxiv.org/pdf/1001.2267.

"Industrial Applications of Automatic Speech Recognition Systems", by Ramakant Tiwari, Published at International Journal of Research Publication and Reviews, Published Online in [Aug. 2024] https://ijrpr.com/uploads/V5ISSUE8/IJRPR32383.pdf.

"Development Considerations for Implementing a Voice-Controlled Spacecraft System", By George Salazar, Published at 2019 IEEE International Symposium on Measurement and Control in Robotics (ISMCR), Published Online on [Jan. 13, 2020] https://ntrs.nasa.gov/api/citations/20190026545/downloads/20190026545.pdf.

* cited by examiner

| MULTIPLE COMMUNICATIONS 104 | TACTICAL RECOMMENDATION 107 | ACTION INDICATOR 304 |
|---|---|---|
| AMMUNITION RESUPPLY 306 | "RECOMMEND IMMEDIATE RESUPPLY OF 5.56MM AMMUNITION TO DELTA COMPANY." | RESUPPLY: DISPATCH SUPPLY TRUCK TO GRID 123456. 302 305 |
| MEDICAL SUPPLIES 308 | "SUGGEST SENDING MEDICAL SUPPLIES, INCLUDING BANDAGES AND IV KITS, TO ECHO COMPANY." | MEDICAL SUPPORT: DEPLOY MEDICS AND SUPPLIES TO GRID 234567. 302 305 |
| FUEL RESUPPLY 310 | "ADVISE SENDING FUEL RESUPPLY FOR VEHICLES TO FOXTROT COMPANY." | RESUPPLY: TRANSPORT FUEL TO GRID 345678. 302 305 |
| RATION 312 | "RECOMMEND SENDING RATIONS AND WATER TO BRAVO COMPANY." | RESUPPLY: DELIVER FOOD AND WATER TO GRID 456789. 302 305 |
| REQUEST FOR REINFORCEMENTS 314 | "RECOMMEND DISPATCHING REINFORCEMENTS TO SUPPORT ALPHA COMPANY." | REINFORCE: SEND ADDITIONAL TROOPS TO GRID 567890. 302 305 |
| ENGINEERING SUPPORT 316 | "SUGGEST DEPLOYING ENGINEERS TO REPAIR THE BRIDGE AT GOLF COMPANY'S LOCATION." | ENGINEERING SUPPORT: SEND ENGINEERS AND MATERIALS TO GRID 678901. 302 305 |
| ARTILLERY SUPPORT 318 | "ADVISE PROVIDING ARTILLERY SUPPORT AT CHARLIE COMPANY'S COORDINATES." | FIRE SUPPORT: COORDINATE ARTILLERY STRIKE AT COORDINATES 789012. 302 305 |
| INTELLIGENCE UPDATE 320 | "RECOMMEND GATHERING UPDATED INTEL ON ENEMY POSITIONS VIA RECON TEAM." | RECON: DEPLOY UAVS TO GRID 890123 FOR SURVEILLANCE. 302 305 |
| COMMUNICATIONS EQUIPMENT 322 | "SUGGEST SENDING ADDITIONAL WEARABLE MICROPHONES AND COMMUNICATION GEAR TO DELTA COMPANY." | TECH SUPPORT: DELIVER COMMUNICATION EQUIPMENT TO GRID 901234. 302 305 |
| LOGISTICS SUPPORT 324 | "ADVISE PROVIDING LOGISTICAL SUPPORT FOR SUPPLY TRANSPORTATION TO FOXTROT COMPANY." | LOGISTICS: ARRANGE TRANSPORT VEHICLES FOR SUPPLIES TO GRID 012345. 302 305 |

ACTION VIEW 350

FIG. 3

| SCENARIO 702 | MULTIPLE COMMUNICATIONS 104 | AI-GENERATED RECOMMENDATION 704 |
|---|---|---|
| ENEMY ENCOUNTER | "ALPHA COMPANY, ENGAGE ENEMY FORCES AT GRID 123456." | "RECOMMEND DEPLOYING BRAVO COMPANY TO FLANK ENEMY FROM THE SOUTH. REINFORCEMENTS AVAILABLE FROM CHARLIE COMPANY." |
| LOGISTICS REQUEST | "HQ, THIS IS DELTA COMPANY. WE NEED IMMEDIATE RESUPPLY OF AMMUNITION AT LOCATION 789012." | "APPROVE RESUPPLY. SUGGEST ROUTE THROUGH SECTOR 3 TO AVOID ENEMY DETECTION. ETA 30 MINUTES." |
| MEDICAL EVACUATION | "ECHO COMPANY TO HQ, WE HAVE WOUNDED AT GRID 345678, REQUESTING MEDEVAC." | "DEPLOY MEDICAL TEAM. RECOMMEND USING UAV FOR REAL-TIME MONITORING OF EXTRACTION ROUTE. ESTIMATED EXTRACTION TIME: 15 MINS." |
| ARTILLERY SUPPORT | "BRAVO COMPANY REQUESTING ARTILLERY SUPPORT AT COORDINATES 567890." | "CONFIRM ARTILLERY COORDINATES. SUGGEST ADJUSTING FIRE BY 100 METERS NORTH TO MAXIMIZE IMPACT. COORDINATION WITH FIRE SUPPORT TEAM REQUIRED." |
| RECONNAISSANCE REPORT | "RECON TEAM TO HQ, ENEMY ARMOR SPOTTED AT GRID 456789." | "INCREASE SURVEILLANCE IN AREA. RECOMMEND DISPATCHING ANTI-ARMOR UNITS FROM NEAREST POSITION. PROVIDE CONTINUOUS UPDATES TO RECON TEAM." |
| OPERATIONAL UPDATE | "HQ TO ALL UNITS, UPDATE ON MISSION PROGRESS AND STATUS." | "COLLATE ALL UNIT REPORTS. GENERATE SITUATIONAL OVERVIEW: ALPHA ENGAGED, BRAVO FLANKING, CHARLIE IN RESERVE, DELTA RESUPPLYING." |
| AIR SUPPORT COORDINATION | "FOXTROT COMPANY TO HQ, REQUESTING AIR SUPPORT AT COORDINATES 678901." | "APPROVE AIR SUPPORT. COORDINATE WITH AIR COMMAND FOR ETA AND ENSURE GROUND UNITS MARK POSITIONS TO AVOID FRIENDLY FIRE." |
| STRATEGIC WITHDRAWAL | "CHARLIE COMPANY TO HQ, ENEMY STRENGTH OVERWHELMING, REQUESTING PERMISSION TO WITHDRAW TO FALLBACK POSITION." | "AUTHORIZE STRATEGIC WITHDRAWAL. RECOMMEND ROUTE THROUGH SECTOR 2 TO MINIMIZE EXPOSURE. PREPARE DEFENSIVE POSITIONS AT FALLBACK POINT." |
| COMMAND BRIEFING | "BATTALION COMMANDER TO ALL COMPANIES, BRIEFING AT 0800 HOURS." | "PREPARE BRIEFING MATERIALS. SUMMARIZE CURRENT MISSION STATUS, ENEMY ACTIVITY, AND NEXT OBJECTIVES. ENSURE SECURE COMMS FOR BRIEFING." |
| ENGINEERING SUPPORT | "GOLF COMPANY TO HQ, BRIDGE AT GRID 234567 IS DAMAGED, REQUESTING ENGINEERING SUPPORT." | "DISPATCH ENGINEERING UNIT. ESTIMATED REPAIR TIME: 2 HOURS. RECOMMEND SECURING PERIMETER TO ENSURE SAFETY DURING REPAIRS." |

LOCAL VIEW 750

FIG. 7

| TYPE OF COMMUNICATION 900 | TRANSCRIPTION 125 | USEFUL QUERIES 902 TO ASK THE AI |
|---|---|---|
| ENEMY CONTACT | "ALPHA COMPANY, WE'VE ENCOUNTERED ENEMY FORCES AT GRID 123456." | "AI, WHAT IS THE RECOMMENDED TACTICAL RESPONSE TO THIS ENEMY ENCOUNTER?" |
| RESUPPLY REQUEST | "DELTA COMPANY, REQUESTING IMMEDIATE RESUPPLY OF AMMUNITION AT LOCATION 789012." | "AI, WHAT IS THE OPTIMAL RESUPPLY ROUTE AND ETA FOR DELTA COMPANY'S LOCATION?" |
| MEDICAL EVACUATION | "ECHO COMPANY TO HQ, WE HAVE WOUNDED AT GRID 345678, REQUESTING MEDEVAC." | "AI, COORDINATE MEDEVAC. WHAT IS THE SAFEST EXTRACTION ROUTE AND ESTIMATED TIME FOR MEDEVAC COMPLETION?" |
| ARTILLERY SUPPORT | "BRAVO COMPANY REQUESTING ARTILLERY SUPPORT AT COORDINATES 567890." | "AI, VERIFY ARTILLERY COORDINATES AND PROVIDE FIRE ADJUSTMENT RECOMMENDATIONS." |
| RECONNAISSANCE UPDATE | "RECON TEAM TO HQ, ENEMY ARMOR SPOTTED AT GRID 456789." | "AI, ANALYZE RECON DATA AND SUGGEST NEXT STEPS FOR ENGAGING OR AVOIDING ENEMY ARMOR." |
| OPERATIONAL STATUS | "HQ TO ALL UNITS, UPDATE ON MISSION PROGRESS AND STATUS." | "AI, COMPILE MISSION STATUS REPORTS AND GENERATE AN OPERATIONAL OVERVIEW FOR ALL UNITS." |
| AIR SUPPORT REQUEST | "FOXTROT COMPANY TO HQ, REQUESTING AIR SUPPORT AT COORDINATES 678901." | "AI, CONFIRM AIR SUPPORT REQUEST AND ENSURE COORDINATION WITH AIR COMMAND. WHAT IS THE ETA FOR AIR SUPPORT ARRIVAL?" |
| STRATEGIC WITHDRAWAL | "CHARLIE COMPANY TO HQ, REQUESTING PERMISSION TO WITHDRAW TO FALLBACK POSITION." | "AI, RECOMMEND THE BEST WITHDRAWAL ROUTE AND TIMING FOR CHARLIE COMPANY TO MINIMIZE EXPOSURE TO ENEMY FIRE." |
| BRIEFING NOTIFICATION | "BATTALION COMMANDER TO ALL COMPANIES, BRIEFING AT 0800 HOURS." | "AI, PREPARE BRIEFING MATERIALS SUMMARIZING CURRENT MISSION STATUS, ENEMY ACTIVITY, AND NEXT OBJECTIVES." |
| ENGINEERING SUPPORT | "GOLF COMPANY TO HQ, BRIDGE AT GRID 234567 IS DAMAGED, REQUESTING ENGINEERING SUPPORT." | "AI, DISPATCH ENGINEERING UNIT AND ESTIMATE REPAIR TIME. WHAT ARE THE SECURITY RECOMMENDATIONS DURING REPAIRS?" |

QUERY VIEW 950

FIG. 9

ADAPTIVE MISSION STRATEGY OPTIMIZATION THROUGH AI-GENERATED AMBIENT RECOMMENDATIONS FOR TACTICAL COMMAND

CLAIM OF PRIORITY

This Application is a conversion Application of, claims priority to, and incorporates by reference herein the entirety of the disclosures of:

U.S. Provisional Patent Application No. 63/614,022 titled MULTI-FUNCTIONAL WEARABLE AI-ENABLED PENDANT APPARATUS, SYSTEM, AND METHOD OF AMBIENT DATA ANALYSIS AND COMMUNICATION IN LAW ENFORCEMENT, FIRE, MEDICAL RESPONDER, PRIVATE SECURITY, JOURNALISM, COMMERCIAL AND MILITARY OPERATIONAL ENVIRONMENTS filed on Dec. 22, 2023;

U.S. Provisional Patent Application No. 63/626,075 titled SECURE EDGE MESH NETWORK SYSTEM FOR ENHANCED VISUAL INTERPRETATION AND REAL-TIME SITUATIONAL AWARENESS IN COMBAT ZONES filed on Jan. 29, 2024;

U.S. Utility patent application Ser. No. 18/437,200 titled RESPONSE PLAN MODIFICATION THROUGH ARTIFICIAL INTELLIGENCE APPLIED TO AMBIENT DATA COMMUNICATED TO AN INCIDENT COMMANDER filed on Feb. 8, 2024; and U.S. Provisional Patent Application No. 63/554,360 titled ENHANCED SITUATIONAL AWARENESS THROUGH A HAPTIC WEARABLE DEVICE OF A POLICE OFFICER OR A WARFIGHTER, ACTIVATED BY A NEARBY NETWORKED VEHICLE OR A STATIONARY SENSOR UPON DETECTING A THREAT filed on Feb. 16, 2024.

FIELD OF TECHNOLOGY

The present disclosure relates generally to the field of tactical technology. More specifically, the invention pertains to a method, system, and apparatus of adaptive mission strategy optimization through AI-generated ambient recommendations for tactical command.

BACKGROUND

A Special Forces battalion commander is an officer who leads a highly trained 12-person operational detachment alpha (ODA) team. The ODA is capable of conducting a wide range of special operations, including building indigenous security forces, identifying threats to U.S. interests, and training foreign populations in unconventional warfare. The commander's responsibilities include organizing the mission, equipping the team, and debriefing them on the mission's objectives. During combat or emergency incidents, the battalion commander may serve as the primary decision-maker, directing tactics, rescue operations, and coordinating with other military and civilian services. They play a significant role in planning and implementing strategies for response, ensuring that deployments are adequately staffed and equipped. The role of a Special Forces battalion commander is both challenging and demanding. One of the biggest challenges is making quick, accurate, and effective decisions during high-stakes situations. Combat scenes are often chaotic and multifaceted, involving numerous variables like enemy behavior, structural integrity of buildings, civilian presence, and environmental conditions. The pressure of knowing that decisions can directly affect the safety and lives of both civilians and team members adds significant stress and responsibility.

Resources like personnel, equipment, and financial support are often limited. In large-scale operations or when multiple missions occur simultaneously, these resources can be stretched thin. Determining the most effective deployment of resources requires a deep understanding of the mission needs versus available assets. Misallocation can lead to inadequate responses and increased risks. There's a risk of overextending the battalion's capabilities, which can compromise mission effectiveness and troop safety, especially if the situation escalates or prolongs. Staying calm and composed in high-stress environments is crucial. The commander's demeanor and decisions directly affect the morale and confidence of the team. Showing uncertainty or panic can undermine the team's effectiveness.

Information overload is a significant challenge for battalion commanders, especially during high-pressure and rapidly evolving situations. During emergencies, commanders are inundated with a vast amount of information from various sources, including radio communications, reports from the field, data from sensors and surveillance systems, and inputs from other military and civilian services. Processing and assimilating all this information quickly and accurately can be overwhelming, leading to difficulty in prioritizing and focusing on the most critical data.

Emergencies and combat scenarios can evolve rapidly. Keeping up with the pace of change and continuously updating strategies based on new information adds to the cognitive load. There's a risk of crucial information being missed or outdated due to the rapid succession of events. With lives and mission success at stake, commanders may not be able to make quick enough decisions based on the information they receive. Information overload can lead to decision fatigue, slowing down response times or leading to less optimal decisions. The pressure to act quickly can also lead to snap decisions without fully considering all available information.

Information overload can lead to miscommunication, unclear instructions, or vital information being lost in the sea of incoming data. Managing and disseminating information efficiently to various teams while maintaining clarity can be a formidable task. Continuously dealing with excessive information, especially in life-threatening situations, can lead to high levels of stress and mental strain. This can impact the commander's overall health and well-being. Prolonged exposure to such conditions can lead to burnout, impacting performance and decision-making ability over time.

Similarly, batallion commanders and police chiefs often struggle with information overload during critical incidents, as they have to process multiple streams of communication from dispatch, fellow officers, and witnesses, all while trying to make quick, accurate decisions. Limited real-time synthesis of radio feeds on suspect movements, potential threats, and the presence of weapons can make it difficult to coordinate responses effectively, increasing the risk of delays, tactical errors, and unintended harm to bystanders during operations.

SUMMARY

Disclosed are a method, system, and apparatus of adaptive mission strategy optimization through AI-generated ambient recommendations for tactical command.

In one aspect, a method includes simultaneously listening to multiple communications surrounding a wearer, amplifying a human speech detected in the multiple communications through a wearable microphone, and using an artificial intelligence model to generate a tactical recommendation to the wearer through a mobile device accessible to the wearer.

The tactical recommendation provided to the wearer may be based on a global position system (GPS) location of the wearer. The artificial intelligence model may transcribe the human speech amplified through the wearable microphone. The method may include an edge based compute module on a body of the wearer to run the artificial intelligence model. A transcription and/or an inference from the human speech may be generated through the artificial intelligence model without need of an internet connection through the edge based compute module.

The artificial intelligence model may be stored on a local storage on the body of the wearer. The transcription may be stored on the local storage on the body of the wearer. The transcription and/or the inference from the human speech may be optionally securely communicated through the internet connection to an aggregation server. The aggregation server may perform aggregate inference operations on numerous transcriptions collected from a plurality of wearers across a distributed area. The aggregation server may capture the global position system (GPS) location of each wearer.

The method may further include canceling non-speech noises from captured audio of the multiple communications through the wearable microphone, determining a directionality of a source of the human speech surrounding the wearer, assigning a radio and/or a speaker to the human speech based on the directionality, and/or separating speech waveforms to segregate unique speakers among the sources of the human speech.

In addition, the method may include recommending the tactical recommendation through the mobile device by using the human speech as an inference input data to the artificial intelligence model. The artificial intelligence model may be a Wearer Assistant Artificial-Intelligence Model ("WAAIM") trained on optimal tactical responses given a particular operational scenario. The operational scenario may be a law enforcement scenario and/or a military scenario.

The captured audio may be an input to the WAAIM and/or may be provided from a dispatch center, a tactical vehicle, an informant, a drone, and/or an observational camera in the area of a law enforcement operation and/or a military operation. The multiple communications may be trusted radio communications from a squad soldier, a company commander, the dispatch center, a forward operating base, and/or a command center.

The method may further include analyzing a video feed from an unmanned aerial vehicle encompassing an area of the law enforcement operation and/or the military operation, applying a computer vision algorithm to the video feed from the unmanned aerial vehicle to identify a risk associated with operational objectives in the law enforcement operation and/or the military operation, and/or modifying an incident action plan based on the identification of the risk associated with operational objectives in the area of the law enforcement operation and/or the military operation.

Furthermore, the method may include generating a next action recommendation associated with the tactical recommendation and/or displaying the tactical recommendation along with the next action recommendation on the mobile device accessible to the wearer.

Additionally, the method may include fine-tuning a large language model based on an operational plan data, a policy data, a procedure data, a historical response data, and/or an emergency operation plan data associated with a rule of engagement.

In another aspect, a wearable microphone includes a set of directional microphones in an array within the wearable microphone to simultaneously listen to multiple communications surrounding a wearer. The set of directional microphones amplifies a human speech detected in the multiple communications through the wearable microphone, cancels non-speech noises from the captured audio of the multiple communications through the wearable microphone, determines a directionality of a source of the human speech surrounding the wearer, separates speech waveforms to segregate unique speakers among the sources of the human speech, and provides a tactical recommendation to the wearer through a mobile device accessible to the wearer when the multiple communications are interpreted by an artificial intelligence model.

The tactical recommendation provided to the wearer may be based on a global position system (GPS) location of the wearer. The artificial intelligence model may transcribe the human speech amplified through the wearable microphone. An edge based compute module on a body of the wearer may run the artificial intelligence model. A transcription and/or an inference from the human speech through the artificial intelligence model may be generated without need of an internet connection through the edge based compute module.

The wearable microphone may analyze a video feed from an unmanned aerial vehicle encompassing an area of a law enforcement operation and/or a military operation. A computer vision algorithm may be applied to the video feed from the unmanned aerial vehicle to identify a risk associated with operational objectives in the law enforcement operation and/or the military operation. An incident action plan may be modified based on the identification of the risk associated with operational objectives in the area of the law enforcement operation and/or the military operation.

In yet another aspect, a system includes a wearable microphone to cancel non-speech noises from captured audio while simultaneously amplifying a human speech captured by the wearable microphone, an edge based compute module to transcribe the human speech captured through the wearable microphone, and/or an artificial intelligence model operating on the edge based compute module to generate a tactical recommendation accessible to a wearer.

A transcription and/or an inference from the human speech may be securely communicated through an internet connection to an aggregation server. The aggregation server may perform aggregate inference operations on numerous transcriptions collected from a plurality of wearers across a distributed area. The aggregation server may capture a global position system (GPS) location of each wearer.

The apparatus, devices, methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3 is an action view illustrating a user interface of the display in which different types of multiple communications are associated with different recommended actions generated by the WAAIM of FIG. 1, according to one embodiment.

FIG. 7 is a local view illustrating a user interface of the display in which different scenarios are associated with different multiple communications amplified using the wearable microphone along with an AI-generated recommendation, according to one embodiment.

FIG. 9 is a query view illustrating useful queries that might be possible to the generative AI wearable microphone for different types of communications, according to one embodiment.

Figure 1:
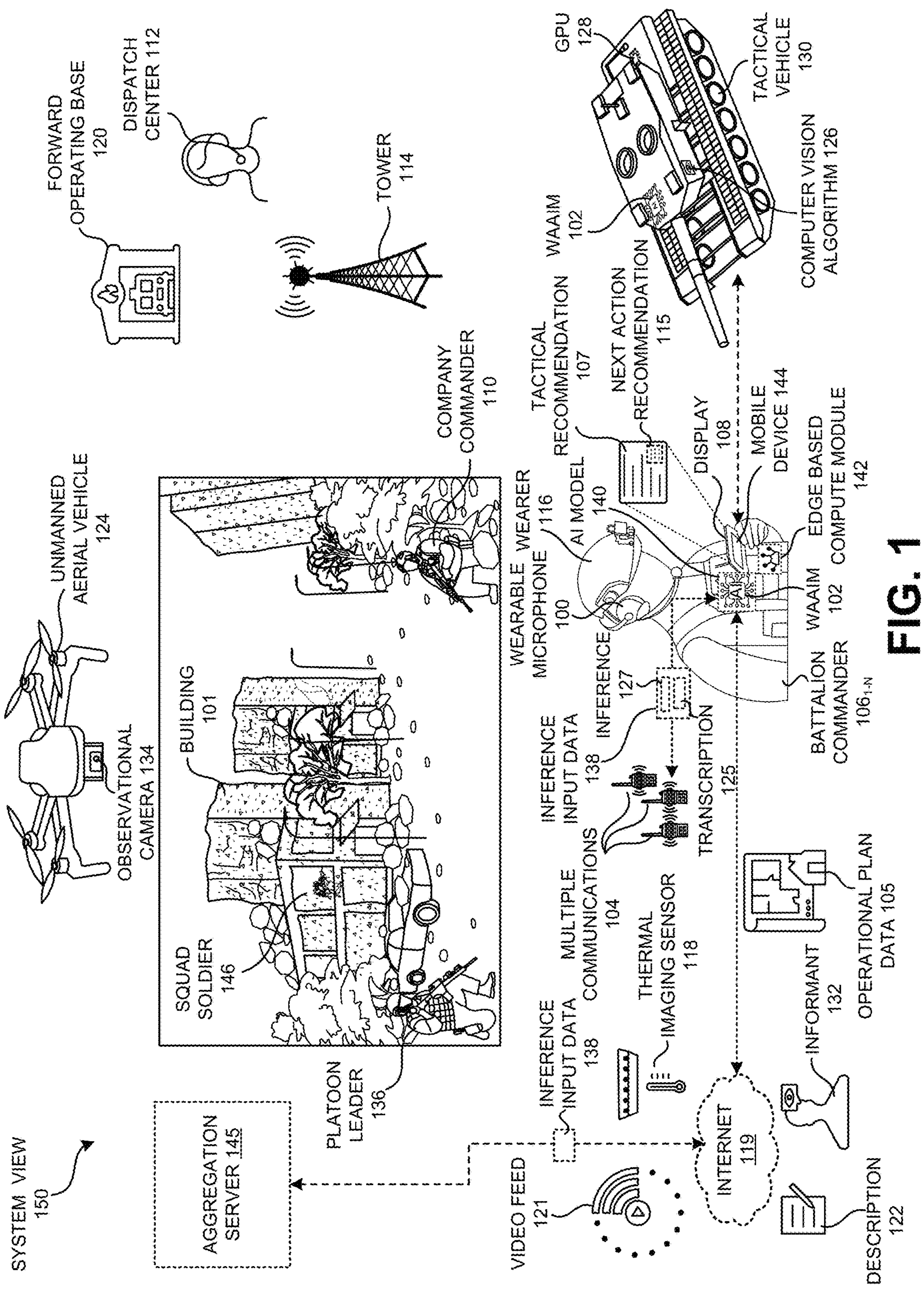
FIG. 1 is a system view to automatically provide a tactical recommendation to a wearer on a display of a computing device based on human speech detected in multiple communications through a wearable microphone of the wearer with captured information processed through a Wearer Assistant Artificial-Intelligence Model ("WAAIM"), according to one embodiment.

Other features of the present embodiments will be apparent from the accompanying drawings and from the detailed description that follows.

DETAILED DESCRIPTION

Disclosed is a method, system, and apparatus of adaptive mission strategy optimization through AI-generated ambient recommendations for tactical command.

Municipal Police Scenarios

For example, In Elizabeth, New Jersey, police officers could use FireFly™, during high-stress tactical situations to optimize decision-making and resource deployment in real-time, according to one embodiment.

For example, if officers receive multiple calls about a developing situation in a busy commercial area, such as an active shooter or a hostage crisis, FireFly™ would simultaneously listen to radio communications from officers, nearby dispatch, and any reports from civilians, according to one embodiment. The AI-powered system would process this audio and filter out irrelevant background noise, focusing only on critical information from officers at the scene, according to one embodiment.

The system could amplify relevant communications, such as an officer reporting the suspect's last known location or describing potential escape routes, according to one embodiment. Using these inputs, the AI would analyze the current situation and quickly generate a tactical recommendation, according to one embodiment. For instance, based on the city layout and the suspect's position, it might suggest using side streets to block escape routes or deploying UAVs to monitor the area from above, according to one embodiment. If a nearby drone detects heat signatures of multiple individuals inside a building, FireFly™ could alert officers to possible hostages and recommend establishing perimeters at strategic entry points, according to one embodiment.

Additionally, as officers navigate through densely populated areas, the AI could provide real-time updates about civilian movements, allowing for safer evacuation plans. It would constantly update based on new information, ensuring that officers receive the most up-to-date tactical suggestions to neutralize threats and protect civilians effectively, according to one embodiment.

Special Forces Scenarios

Special Forces can use the GovGPT FireFly™ system to enhance their decision-making, situational awareness, and tactical execution during high-stakes missions, according to one embodiment. The system combines real-time data from various sources, such as radio communications, drone footage, and surveillance equipment, and processes it using artificial intelligence to provide actionable recommendations tailored to the evolving mission environment, according to one embodiment.

For example, during missions, Special Forces teams may have to process large amounts of information quickly, such as enemy movements, terrain conditions, and civilian presence, according to one embodiment. The FireFly™ system listens to multiple communications simultaneously, including radio chatter, enemy movements, and surveillance inputs, according to one embodiment. It amplifies relevant information, filters out background noise, and delivers clear tactical recommendations to the team based on current data, according to one embodiment.

For example, if an enemy patrol is detected near the team's location, FireFly™ can recommend alternative routes or tactics to avoid detection, such as using natural cover or deploying UAVs for real-time overwatch, according to one embodiment.

FireFly™ integrates data from drones, UAVs, and ground sensors, providing the team with real-time visuals and updates, according to one embodiment. For instance, the system can analyze video feeds from drones to detect enemy positions, identify civilians in a target area, or locate potential threats like improvised explosive devices (IEDs). By giving the team a comprehensive view of their surroundings, FireFly™ allows for more informed decision-making, according to one embodiment.

In a mission where hostages are being held in a building, FireFly™ could provide a live map of enemy positions, entry points, and areas with civilians, allowing the team to plan their approach with precision, according to one embodiment.

When conducting a raid or rescue operation, timing and coordination are critical. FireFly™ can assist by providing recommendations on the safest entry points based on enemy positions and structural weaknesses, according to one embodiment. It can also suggest the use of specific tools, such as breaching charges or flashbangs, to minimize risk to the hostages and team members, according to one embodiment.

For example, if an area is wired with explosives or heavily guarded, FireFly™ could suggest an alternative entry route that avoids these dangers, ensuring a smoother and safer operation, according to one embodiment.

Once the primary mission objective is completed, such as rescuing hostages or capturing a target, the team often needs to quickly extract from the area while evading enemy reinforcements. FireFly™ monitors approaching threats and updates the team with recommended extraction routes, according to one embodiment. It also factors in environmental conditions, like terrain and potential ambush sites, to guide the team to a secure evacuation point, according to one embodiment.

If enemy reinforcements are detected en route, FireFly™ might recommend laying traps, such as tripwires or mines, to delay the enemy while the team moves to the extraction point, according to one embodiment.

FireFly™ is equipped with edge computing capabilities, meaning it can process data locally without relying on an internet connection, according to one embodiment. This feature is particularly useful in remote or hostile environments where connectivity may be limited, according to one embodiment. The AI can run advanced algorithms on the wearable devices, offering immediate tactical suggestions even in areas with poor or no communication infrastructure, according to one embodiment.

In situations where satellite communications are disrupted, the system will still function effectively, ensuring that the team has the intelligence it needs to carry out the mission, according to one embodiment. Missions often evolve rapidly, with new threats or opportunities emerging unexpectedly. FireFly™ continuously processes new information and adapts its recommendations in real time, according to one embodiment. Whether it's changing weather conditions, the arrival of enemy reinforcements, or the discovery of new hostages, the system helps the team stay flexible and responsive, according to one embodiment.

For example, if a UAV detects unexpected enemy reinforcements arriving from the north, FireFly™ could immediately recommend a new route to avoid confrontation or advise on setting up an ambush, according to one embodiment.

The described embodiments represent a groundbreaking approach in tactical technology. GovGPT FireFly™ is a wearable artificial intelligence (AI) device (e.g., using a generative AI wearable microphone 100 of the Wearer Assistant Artificial-Intelligence Model "WAAIM" 102) designed for military and police battalion chiefs and battalion commanders $\mathbf{106}_{1-N}$ in tactical scenarios, according to one embodiment. It silently listens to multiple communications 104 (e.g., radio communications, reports from the field, audiovisual data from sensors and surveillance systems, and inputs from other military and civilian service sources, etc.) received during an active tactical combat, and provides real-time tactical recommendations 107 to modify an incident action plan 200 based on changing circumstances and the identification of the risk associated with operational objectives in the area of law enforcement operation and/or the military operation. These tactical recommendations 107 are provided on a touchscreen display 108 and the battalion commander $\mathbf{106}_{1-N}$ is able to adopt and implement suggestions with just a single click, according to one embodiment.

The GovGPT FireFly™ microphone (e.g., using a generative AI wearable microphone 100 of the WAAIM 102) also facilitates hands-free operation through interactive voice response 802, providing real-time data querying for information in emergency situations, according to one embodiment. The device is built to be durable and resistant to extreme conditions, including heat, smoke, and/or water. It is compact for ease of wear during extended operations, according to one embodiment.

In one embodiment, a method includes simultaneously listening to multiple communications 104 surrounding a wearer 116, amplifying a human speech detected in the multiple communications 104 through a wearable microphone 100, and using an artificial intelligence model 140 to generate a tactical recommendation 107 to the wearer 116 through a mobile device 144 accessible to the wearer 116.

The tactical recommendation 107 provided to the wearer 116 may be based on a global position system (GPS) location of the wearer 116. The artificial intelligence model 140 may transcribe the human speech amplified through the wearable microphone 100. The method may include an edge based compute module 142 on a body of the wearer 116 to run the artificial intelligence model 140. A transcription 125 and/or an inference 127 from the human speech may be generated through the artificial intelligence model 140 without need of an internet connection through the edge based compute module 142.

The artificial intelligence model 140 may be stored on a local storage on the body of the wearer 116. The transcription 125 may be stored on the local storage on the body of the wearer 116. The transcription 125 and/or the inference 127 from the human speech may be optionally securely communicated through the internet connection to an aggregation server 145. The aggregation server 145 may perform aggregate inference operations on numerous transcriptions 125 collected from a plurality of wearers 116 across a distributed area. The aggregation server 145 may capture the global position system (GPS) location of each wearer 116.

The method may further include canceling non-speech noises from captured audio of the multiple communications 104 through the wearable microphone 100, determining a directionality of a source of the human speech surrounding the wearer 116, assigning a radio and/or a speaker to the human speech based on the directionality, and/or separating speech waveforms to segregate unique speakers among the sources of the human speech.

In addition, the method may include recommending the tactical recommendation 107 through the mobile device 144 by using the human speech as an inference input data 138 to the artificial intelligence model 140. The artificial intelligence model 140 may be a Wearer Assistant Artificial-Intelligence Model ("WAAIM") 102 trained on optimal tactical responses given a particular operational scenario. The operational scenario may be a law enforcement scenario and/or a military scenario.

The captured audio may be an input to the WAAIM 102 and/or may be provided from a dispatch center 112, a tactical vehicle 130, an informant 132, a drone, and/or an observational camera 134 in the area of a law enforcement operation and/or a military operation. The multiple communications 104 may be trusted radio communications from a squad soldier, a company commander 110, the dispatch center 112, a forward operating base 120, and/or a command center.

The method may further include analyzing a video feed 121 from an unmanned aerial vehicle 124 encompassing an area of the law enforcement operation and/or the military operation, applying a computer vision algorithm to the video feed 121 from the unmanned aerial vehicle 124 to identify a risk associated with operational objectives in the law enforcement operation and/or the military operation, and/or modifying an incident action plan 200 based on the identification of the risk associated with operational objectives in the area of the law enforcement operation and/or the military operation.

Furthermore, the method may include generating a next action recommendation 115 associated with the tactical recommendation 107 and/or displaying the tactical recommendation 107 along with the next action recommendation 115 on the mobile device 144 accessible to the wearer 116.

Additionally, the method may include fine-tuning a large language model based on an operational plan data 105, a policy data, a procedure data, a historical response data, and/or an emergency operation plan data associated with a rule of engagement.

In another embodiment, a wearable microphone 100 includes a set of directional microphones in an array within the wearable microphone 100 to simultaneously listen to multiple communications 104 surrounding a wearer 116. The set of directional microphones amplifies a human speech detected in the multiple communications 104 through the wearable microphone 100, cancels non-speech noises from the captured audio of the multiple communications 104 through the wearable microphone 100, determines a directionality of a source of the human speech surrounding the wearer 116, separates speech waveforms to segregate unique speakers among the sources of the human speech and provides a tactical recommendation 107 to the wearer 116 through a mobile device 144 accessible to the wearer 116 when the multiple communications 104 are interpreted by an artificial intelligence model 140.

The tactical recommendation 107 provided to the wearer 116 may be based on a global position system (GPS) location of the wearer 116. The artificial intelligence model 140 may transcribe the human speech amplified through the wearable microphone 100. An edge based compute module 142 on a body of the wearer 116 may run the artificial intelligence model 140. A transcription 125 and/or an inference 127 from the human speech through the artificial intelligence model 140 may be generated without need of an internet connection through the edge based compute module 142.

The wearable microphone 100 may analyze a video feed 121 from an unmanned aerial vehicle 124 encompassing an area of a law enforcement operation and/or a military operation. A computer vision algorithm 126 may be applied to the video feed 121 from the unmanned aerial vehicle 124 to identify a risk associated with operational objectives in the law enforcement operation and/or the military operation. An incident action plan 200 may be modified based on the identification of the risk associated with operational objectives in the area of the law enforcement operation and/or the military operation.

In yet another embodiment, a system includes a wearable microphone 100 to cancel non-speech noises from captured audio while simultaneously amplifying a human speech captured by the wearable microphone 100, an edge based compute module 142 to transcribe the human speech captured through the wearable microphone 100, and/or an artificial intelligence model 140 operating on the edge based compute module 142 to generate a tactical recommendation 107 accessible to a wearer 116.

A transcription 125 and/or an inference 127 from the human speech may be securely communicated through an Internet 119 connection to an aggregation server 145. The aggregation server 145 may perform aggregate inference 127 operations on numerous transcriptions 125 collected from a plurality of wearers 116 across a distributed area. The aggregation server 145 may capture a global position system (GPS) location of each wearer 116.

Integration of Geographical Location Plans

Tactical operational plans (e.g. operational plan data 105) can be uploaded to the GovGPT FireFly™ system ahead of time or accessed in real-time from municipal databases when a combat and/or emergency incident is reported. The system's AI analyzes the operational plan to identify key elements such as geographical location, physical conditions of the location, presence of potential threat, civilian presence, building entrances and exits, structural materials, environmental conditions, and areas of potential risk (e.g., risk of security breach of social or commercial institutions, gas lines, chemical storage, etc.), according to one embodiment. Based on this analysis, GovGPT FireFly™ can automatically generate an initial tactical recommendation 107 (e.g., incident action plan 200). This plan can outline optimal entry points for squad soldiers (e.g., the squad soldier 146), areas to prioritize for evacuation, locations for staging equipment, and the best routes for tactical action and/or mission objectives. The AI evaluates the incident's scale, potential risks, and specific needs (e.g., need for additional deployment units, aerial support, etc.) against the available resources, according to one embodiment. It then recommends an initial allocation of resources, suggesting how many units to deploy and where to position them for maximum effectiveness, according to one embodiment.

As the incident evolves, GovGPT FireFly™ can update its tactical recommendation 107 to the battalion commander 106 in real-time, reallocating resources as needed based on the changing situation and additional input from on-scene company commander 110 and/or squad soldiers (e.g., the squad soldier 146). The system can continuously monitor the situation, integrating new data from sensors, drones (e.g., the unmanned aerial vehicle 124), and/or personnel (e.g., company commander 110) on the ground. It can adjust the incident action plan 200 in real time, advising on shifts in resource allocation or tactics as the incident develops. The system can also generate a next action recommendation 115 associated with the tactical recommendation 107 based on the changing situation and additional inputs from on-scene company commander 110 and/or squad soldiers 146. Gov- GPT FireFly™ can serve as a central hub for information dissemination, ensuring all teams have up-to-date plans and maps.

It can automatically communicate adjustments or new orders (e.g., the next action recommendation 115) to all affected units, improving coordination and response time. By providing a detailed, strategic overview of the incident from the outset, GovGPT FireFly™ helps to ensure responder safety, reducing the risk of entering hazardous areas unprepared, according to one embodiment. It enables a more efficient, targeted response, potentially reducing the damage and speeding up the resolution of the incident, according to one embodiment. Integrating building operational plans with GovGPT FireFly™ for automated initial response and resource allocation planning offers a significant advancement in emergency response capabilities, according to one embodiment. This approach not only enhances operational efficiency and safety but also ensures a more coordinated and strategic incident management process, tailored to the specific challenges of each unique situation, according to one embodiment.

FIG. 1 is a network view illustrating automatically suggesting a tactical recommendations 107 to a battalion commander 106 to provide an incident action plan 200 on a display 108, according to one embodiment. FIG. 1 illustrates a system view 150 to automatically provide a tactical recommendation 107 to a wearer 116 on a display 108 of a computing device 144 based on human speech detected in multiple communications 104 through a wearable microphone 100 of the wearer 116 with captured information processed through a Wearer Assistant Artificial-Intelligence Model ("WAAIM") 102, according to one embodiment.

The tactical recommendations 107 are responsive to human speech detected in multiple communications 104 captured by a wearable generative AI wearable microphone 100 (GovGPT FireFly™) on a body of a battalion commander 106, according to one embodiment. The captured information is processed through an Wearer Assistant Artificial-Intelligence Model ("WAAIM") 102, according to one embodiment.

During a hostile and/or emergency incidents, the battalion commander 106 may form an initial incident action plan 200 from a description 122 of the incident provided by a dispatch center 112. The dispatch center 112 may have received a report of the hostile and/or emergency incident from an informant 132, and then contact a security department (e.g., a forward operating base 120) to respond. The security department may have designated a battalion commander 106 (e.g., a company commander 110) to create the initial incident response plan, and then to serve as the battalion commander 106 during the combat mission. The battalion commander 106 may rely on various types of communications (e.g., multiple communication 104) received from different sources to manage a situation effectively. These multiple communications 104 may play a crucial role in ensuring communication among all participating units and personnel, enabling a coordinated response. When the battalion commander 106 hears these communications, so too does the generative AI wearable microphone 100, according to one embodiment. The information captured by the generative AI wearable microphone 100 is then processed through the WAAIM 102 to modify the incident action plan 200 in real time, according to one embodiment. The WAAIM 102 may employ a sophisticated computer vision algorithm 126 to convert video images (e.g., a video feed 121) and audio captured from different communications channels into descriptive text in the form of transcription 125, according to one embodiment. The WAAIM 102 may be formed through a graphics processing unit (GPU) 128, according to one embodiment. The tactical recommendations 107 are displayed on the display 108 (e.g., a GovGPT FireFly™ Display), according to one embodiment.

In one or more embodiments, the wearable microphone 100 may be equipped with sophisticated AI technology to capture multiple communications 104 including reports from the field, data from sensors and surveillance systems in the area of conflict, and inputs from other military and civilian sources, radio communications through tower 114, etc. This capability may have several advantages over single mode of communications, especially in the context of emergency response and incident management, such as during a combat and/or emergency incident. These advantages can make multiple communications 104 (e.g., radio communications through tower 114) the preferred method for coordinating with a battalion commander 106 and other emergency personnel (e.g., company commander 110), according to one embodiment.

The wearer 116 may be equipped with various wearable technologies, including a wearable microphone 100 that captures surrounding human speech, according to one embodiment. The system may listen to multiple communication channels or sources simultaneously such as radio communications, reports from the field, data from sensors and surveillance systems, and inputs from other military and civilian sources, allowing it to analyze conversations and/or communications happening around the wearer 116. The wearable microphone 100 may detect human speech from multiple communication 104 sources and amplifies relevant parts of it, ensuring clear reception of important data, according to one embodiment.

The Wearer Assistant Artificial-Intelligence Model (WAAIM) 102 may process the amplified speech along with other data streams (such as operational plan data 105 and/or thermal imaging data from the thermal imaging sensor 118 in the combat location). The WAAIM 102 may analyze the data to produce an optimized tactical recommendation 107, according to one embodiment.

After the data is processed, the AI model 140 of the wearable microphone 100 may generate a tactical recommendation 107 tailored to the wearer's current situation and based on the identification of the risk associated with operational objectives in the area of the law enforcement operation and/or the military operation, according to one embodiment. This tactical recommendation 107 is aimed at improving decision-making in a mission-critical environment.

The tactical recommendation 107 may be delivered to the wearer 116 through a mobile device 144 accessible to them. The display 108 may show the tactical recommendation 107 in real-time, ensuring the wearer 116 has immediate access to the AI's guidance, according to one embodiment. Platoon leader 136 and company commander 110 may be part of the communication structure, providing leadership inputs to the system. Unmanned Aerial Vehicle 124 and observational camera 134 may contribute visual data streams that can be processed by the AI system for broader situational awareness. Aggregation server 145 and Internet 119 may provide network connectivity, ensuring the seamless flow of data and communications. The edge-based compute module 142 may provide local computing power, processing data close to the wearer 116 in real-time without relying heavily on external servers, according to one embodiment.

Operational plan data 105 may be the preloaded mission data that the AI uses to frame its recommendations within the context of current objectives and operational goals. Tactical vehicle 130 and computer vision algorithm 126 may assist in processing visual data, especially from thermal sensors 118 in the vicinity of the mission location, contributing to tactical recommendations 107, according to one embodiment.

Overall, the system integrates real-time audio, visual, and operational data using artificial intelligence to provide field operatives with critical, context-sensitive recommendations during tactical missions. The combination of multiple communications 104, AI analysis, and real-time recommendation delivery through wearable devices optimizes decision-making on the ground, according to one embodiment. The Wearer Assistant Artificial-Intelligence Model (WAAIM) 102 integrated with the wearable microphone 100 is designed to provide real-time tactical recommendations 107 in emergencies and combat scenarios by analyzing multiple streams of data, according to one embodiment.

The WAAIM 102 may capture real-time voice data through the wearable microphone 100, recognizing and isolating human speech from ambient noise, explosions, and/or environmental sounds in combat zones, according to one embodiment. Using advanced Natural Language Processing (NLP), the system may distinguish between different communication sources. For example, it can differentiate between urgent commands (e.g., "fall back" or "enemy sighted") and less critical chatter. The WAAIM 102 may listen to multiple communications 104 from various channels (e.g., squad members, command centers, etc.) and apply context-aware analysis to prioritize the most critical data streams in emergencies, according to one embodiment.

WAAIM 102 may integrate voice communication with data from other sources such as thermal imaging sensors 118, UAV 124 feeds, video feeds 121, and operational plan data 105. For example, if the WAAIM 102 detects speech about enemy positions or a medical emergency, it cross-references this with live video or thermal data to verify the threat level and/or the medical status of the affected soldier. Based on this data fusion, the WAAIM 102 may generate recommendations suited to the current situation, like suggesting the safest route for retreat if the AI detects imminent danger, according to one embodiment.

If the system detects an impending ambush or firefight based on verbal commands and UAV data, it might generate a next action recommendation 115 to recommend defensive maneuvers and/or suggest flanking routes for counterattacks. The WAAIM 102 could use computer vision algorithms 126 to analyze visual data and detect enemy movements, then recommend a tactical response, such as repositioning troops or requesting backup through a next action recommendation 115, according to one embodiment.

In a medical emergency, where a soldier may have been injured, the WAAIM 102 can recognize distress signals (like "man down") from communication channels. It can prioritize sending an Immediate Evacuation Request or recommend the nearest extraction point based on operational maps and terrain analysis, according to one embodiment.

The WAAIM 102 may continuously monitor and re-analyze the situation as it evolves. If it detects a change (like a breach in security or the arrival of reinforcements), it may adapt its recommendations dynamically. By combining wearable microphone 100 data with thermal imaging and enemy movement predictions, the AI may assess risks to the wearer 116 and generate appropriate recommendations (e.g, using a tactical recommendation 107, a next action recommendation 115) such as "take cover," "move to higher ground," or "reinforce position", according to one embodiment.

Since combat scenarios require immediate responses, the system may use an edge-based compute module 142 close to the wearer 116 to process large amounts of data in real-time, allowing the wearer 116 to receive instantaneous tactical recommendations 107 (e.g., evasion strategies or reinforcements), according to one embodiment.

The final tactical recommendation 107 may be displayed to the wearer 116 on a display 108 of a mobile device 144 and/or a display 202 of a tactical vehicle 130, offering clear and concise actions for the soldier to execute. For example, it may suggest "Move North to safety" or "Enemy advancing from the South, deploy smoke screen", according to one embodiment Over time, the WAAIM 102 may improve its effectiveness through machine learning. By analyzing past combat scenarios and recommendations, it may fine-tune its decision-making to better predict outcomes and optimize responses for future missions, according to one embodiment.

In summary, the WAAIM 102 may leverage advanced audio, visual, and data processing algorithms to provide real-time tactical recommendations that are crucial for the wearer's safety and success in combat or emergencies. The model may fuse various inputs, continuously adapts to evolving situations, an/or delivers actionable insights to the wearer 116 through a user-friendly interface, according to one embodiment.

The aggregation server 145 in the system plays a central role in processing and analyzing the vast amount of data collected from multiple wearers 116 of the wearable microphone 100 across a distributed area. The aggregation server 145 may be responsible for performing aggregate inference operations, synthesizing human speech data from various sources, and providing tactical recommendations 107 using the Wearer Assistant Artificial Intelligence Model (WAAIM) 102. The aggregation server 145 may collect the transcription 125 and inference 127 from the human speech generated through the artificial intelligence model 140 of the wearable microphone 100. This human speech is used as an inference input data 148 to the artificial intelligence model 140. This data may be collected from multiple wearers 116. Each soldier (or wearer 116) in the field is equipped with a wearable microphone 100 that captures real-time audio, including human speech, according to one embodiment.

These audio inputs can come from various wearers 116 dispersed over a large area, participating in different tactical operations, according to one embodiment. This creates a vast and distributed network of speech data inputs. The multiple communications 104 module may listen to various voice channels, ensuring that the speech data from all the wearers 116 is captured and transmitted to the aggregation server 145. The AI model 140 of the wearable microphone 100 may transcribe the human speech amplified through the wearable microphone 100 using a transcription module. This transcription 125 and inference input data 148 from the human speech is communicated to the aggregation server 145 via Internet 119. Each multiple communication 104 received by the wearer 116 is transcribed in real-time and logged, ensuring that a comprehensive record of all verbal interactions and/or communication is available for processing. The aggregation server 145 may receive transcriptions 125 from a plurality of wearers 116 (e.g., squad soldiers, platoon leaders 136, battalion commanders 106) operating in different areas. The aggregation server 145 may aggregate these transcriptions 125 into a unified data set that represents the communications happening across the battlefield and/or operation zone. The aggregation allows the system to identify patterns, trends, and key information spread across different communications, providing a holistic view of the operational environment, according to one embodiment.

The aggregated human speech transcriptions 125 are treated as inference input data 138. The Wearer Assistant Artificial Intelligence Model (WAAIM) 102 uses this input data for analysis and decision-making. The AI model 140 may process the text data, identifying key phrases, commands, and contextual information (e.g., enemy locations, distress signals, commands to move or take cover), according to one embodiment.

The WAAIM 102 may leverage Natural Language Processing (NLP) algorithms to interpret the aggregated speech data. The WAAIM 102 may identify critical pieces of communication (e.g., a platoon leader 136 instructing soldiers to take cover or an enemy's position being shared). It may detect urgency in tone or word choice (e.g., an emergency evacuation command or a distress call from injured personnel). It may correlate multiple wearers' communications (e.g., multiple communications 104) to form a clearer picture of the battlefield scenario, according to one embodiment.

The AI model 140 may also identify patterns across the distributed area, such as repeated enemy sightings, sudden surges in specific commands (e.g., "retreat"), or the emergence of a high-risk situation (e.g., friendly units being surrounded by enemy), according to one embodiment.

According to one embodiment, the Wearer Assistant Artificial Intelligence Model (WAAIM) 102 integrated within the wearable headphone 100 could use a combination of noise cancellation, speech separation, and directional processing to isolate and identify human speech from surrounding noise sources to use the human speech as an inference input data 138 to the artificial intelligence model 140 for generating tactical recommendation 107. The AI model 140 would first capture all surrounding audio using multiple microphones embedded in the wearable headphone 100. Using adaptive noise cancellation algorithms, the system would identify and filter out non-speech noises, such as background music, traffic sounds, or other environmental noise. This could be achieved using spectral subtraction and frequency-based filtering, which distinguish speech frequencies (typically 300 Hz to 3.4 kHz) from non-speech sounds, according to one embodiment. Machine learning (ML) models trained on vast datasets of non-speech sounds could also help recognize and eliminate these noises. To determine the directionality of speech, the system would use beamforming and microphone arrays placed around the wearable device. Beamforming may allow the AI to focus on specific sound directions by adjusting the sensitivity of individual microphones. By analyzing the time differences of arrival (TDOA) of the speech signals at each microphone, the AI could calculate the position and direction from which each speech signal originates. This process helps in segregating different speakers spatially based on their location relative to the wearer 116, according to one embodiment.

After filtering out the noise and detecting the direction of multiple speech signals, the AI would perform speech separation using source separation techniques. Blind Source Separation (BSS) or Independent Component Analysis (ICA) algorithms could help separate overlapping speech signals based on their unique statistical properties. Alternatively, modem deep learning models like deep clustering or spectrogram masking can be used to separate individual speakers' speech waveforms. These models would analyze the audio's spectral features and identify unique patterns of different speakers, allowing the system to extract clean speech from each individual, according to one embodiment.

Once the speech waveforms are separated, the AI could further process the signals to identify unique speakers. This can be done using speaker diarization, which clusters speech segments according to the speaker's voice characteristics, according to one embodiment. Voice activity detection (VAD) may help to isolate active speech segments, while speaker embedding models like x-vectors could capture the unique features of each speaker's voice. By combining voice characteristics with directional data from beamforming, the AI model 140 can accurately track and segregate multiple speakers, even in a noisy environment, according to one embodiment.

Finally, the wearable AI assistant could process these clean speech segments for real-time actions, by aiding in conversation analysis, or providing real-time language translation, depending on its design, according to one embodiment.

The Wearer Assistant Artificial Intelligence Model (WAAIM) 102 integrated within the wearable headphone 100 may use beamforming and directional microphones to identify the direction of sound sources, noise cancellation to filter out non-speech noises, speech separation algorithms to segregate individual speech waveforms, speaker diarization to identify and differentiate unique speakers, and deep learning and ML Models for noise filtering, speech separation, and voice recognition, according to one embodiment.

By leveraging these technologies, the Wearer Assistant Artificial Intelligence Model (WAAIM) 102 in wearable headphones 100 would enable highly effective noise cancellation and speech separation, allowing for better communication and interaction with surrounding speakers, according to one embodiment.

After processing the speech data, the WAAIM 102 may generate tactical recommendations 107 based on the aggregated information, according to one embodiment. The recommendations may include strategic movements for entire squads or units, recommendations for reinforcement deployment, alerts to commanders about potential threats or opportunities identified through the collective communications, according to one embodiment.

The aggregation server 145 may generate recommendations not just for individual wearers $\mathbf{116}_{1\text{-}N}$ but also for entire squads or platoons, optimizing the broader tactical strategy based on comprehensive, real-time battlefield intelligence, according to one embodiment.

Once the recommendations are generated, they are distributed back to individual wearers 116 or commanders (e.g., company commander 110, battalion commander 106). These tactical recommendations 107 may appear on the displays 108 of the mobile devices 144 or wearables, giving real-time, actionable insights to the soldiers on the ground, according to one embodiment.

The aggregation server 145 may continuously collect data, meaning the WAAIM 102 may constantly learn from new inputs. Over time, the AI model 140 may become more adept at generating precise recommendations based on evolving battlefield dynamics, according to one embodiment.

Edge-based compute module 142 processing may ensure that some recommendations are processed locally, but larger-scale inference and cross-unit tactical planning happen at the aggregation server 145 level for more complex operations, according to one embodiment.

The aggregation server 145 is designed to handle vast amounts of data, ensuring scalability as more wearers 116 join the communication network. It may provide coordinated responses by integrating data from multiple soldiers, company commanders 110, UAVs 124, thermal imaging sensors 118, forward operating base 120, dispatch center 120, and command centers, allowing for the optimization of strategies not just on an individual level, but across the entire operation, according to one embodiment.

The tactical recommendations 107 may include emergency evacuations if the aggregation server 145 detects multiple distress calls from soldiers in a particular area, cross-references with video feeds 121 and thermal imaging sensors 118, and recommends immediate evacuation or medical aid, according to one embodiment.

Based on aggregated communication about enemy fire, the AI might recommend better combat positioning by moving to higher ground, flanking maneuvers, or reinforcing a particular position. When commanders or platoon leaders issue orders, the AI aggregates those commands and translates them into a strategically coordinated action plan (e.g., incident action plan 200) for the entire squad, according to one embodiment.

The aggregation server 145 may perform a crucial role in synthesizing and analyzing transcriptions 125 from numerous wearers 116 spread across a distributed area. It may use these transcriptions 125 as input to the WAAIM 102, which, through advanced AI inference operations, generates tactical recommendations 107 that enhance decision-making, coordination, and combat effectiveness in real time. according to one embodiment. The server may ensure that information from multiple sources is fused to provide comprehensive, actionable insights that improve the outcome of military operations, according to one embodiment.

Wearer Assistant Artificial-Intelligence Model (WAAIM) 102 integrated with the wearable microphone 100 systems may allow for hands-free operation, which can be essential for soldiers and other emergency responders (e.g., company commander 110, squad soldier 146, etc.) who need to keep their hands free for equipment, driving, or managing emergency situations, according to one embodiment.

The multiple communications 104 can be encrypted and secured to prevent unauthorized listening, which can be important for maintaining operational security and the privacy of sensitive information, according to one embodiment.

Tactical ground communications may include direct communication from the teams actively engaged in combat operations (e.g., such as a thermal imaging feed from a thermal imaging sensor 118 carried by the squad soldier 146, the video feed 121 from an observational camera 134 of unmanned aerial vehicle 124, and the company commander 110, etc.). These reports may provide real-time information about the mission status, progress in containment, and/or any immediate hazards or changes in risk level. In one embodiment, data from the video feed 121 from the observational camera 134 of the unmanned aerial vehicle 124, the description 122 generated by the dispatch center 112 based on the account from informant 132, and data from the thermal imaging sensor 118 may be communicated to the WAAIM 102 through the Internet 119. The generative AI wearable headphone 100 may assist the battalion commander 106 in suggesting actions to take in response to these multiple communications 104 through the display 108, according to one embodiment. For example, responsive actions may be tactical recommendations 107 to add or remove squad soldiers, move a staging area for containment operations based on changing conditions, or to modify a contingency plan based on risk associated with operational objectives in the law enforcement operation and the military operation, according to one embodiment.

The multiple communications 104 may be urgent and contain critical information about immediate risks to troop's safety, such as flashover warnings, structural collapse, or a mayday call from a trooper in distress. The generative AI wearable headphone 100 may assist the battalion commander 106 in suggesting actions to take in response to emergency traffic through the display 108, according to one embodiment. For example, the WAAIM 102 may generate a tactical recommendation 107 to call in medical and/or evacuation crews in the display 108 (e.g., using logistics support 324 request for medical supplies 308 of the action view 350), according to one embodiment.

It should be noted that while the display 202 may be located in an interior view 250 of the tactical vehicle 130, it may also be on a tablet and/or mobile phone carried by battalion commander 106, according to one embodiment.

Optionally, in an exemplary embodiment, the generative AI wearable microphone 100 can be "queryable" in that the battalion commander 106 can speak directly (e.g., verbal query 800) into the generative AI wearable microphone 100 and ask it questions about the incident. The generative AI wearable microphone 100 can verbally respond according to this embodiment by passing the query through WAAIM 102.

In addition, in another exemplary embodiment, no sensory information can be permanently stored by the WAAIM 102 post incident, to minimize data storage requirements of a department, according to one embodiment (e.g., only stored in random access memory but not in non-volatile storage), according to one embodiment.

Also, while it is shown in FIG. 1 that the WAAIM 102 operates in the tactical vehicle 130 in an edge network format, it should be appreciated that the WAAIM 102 may operate through a wide area network and/or directly on a person of the battalion commander 106 (e.g., a very low computational power requiring embodiment), according to one embodiment.

It should also be noted that the law enforcement operation and/or the military operation may encompass a building 101 such that the one shown in FIG. 1, or it may optically be across numerous buildings, or even in a rural area or forested area, according to various embodiments.

Figure 2:
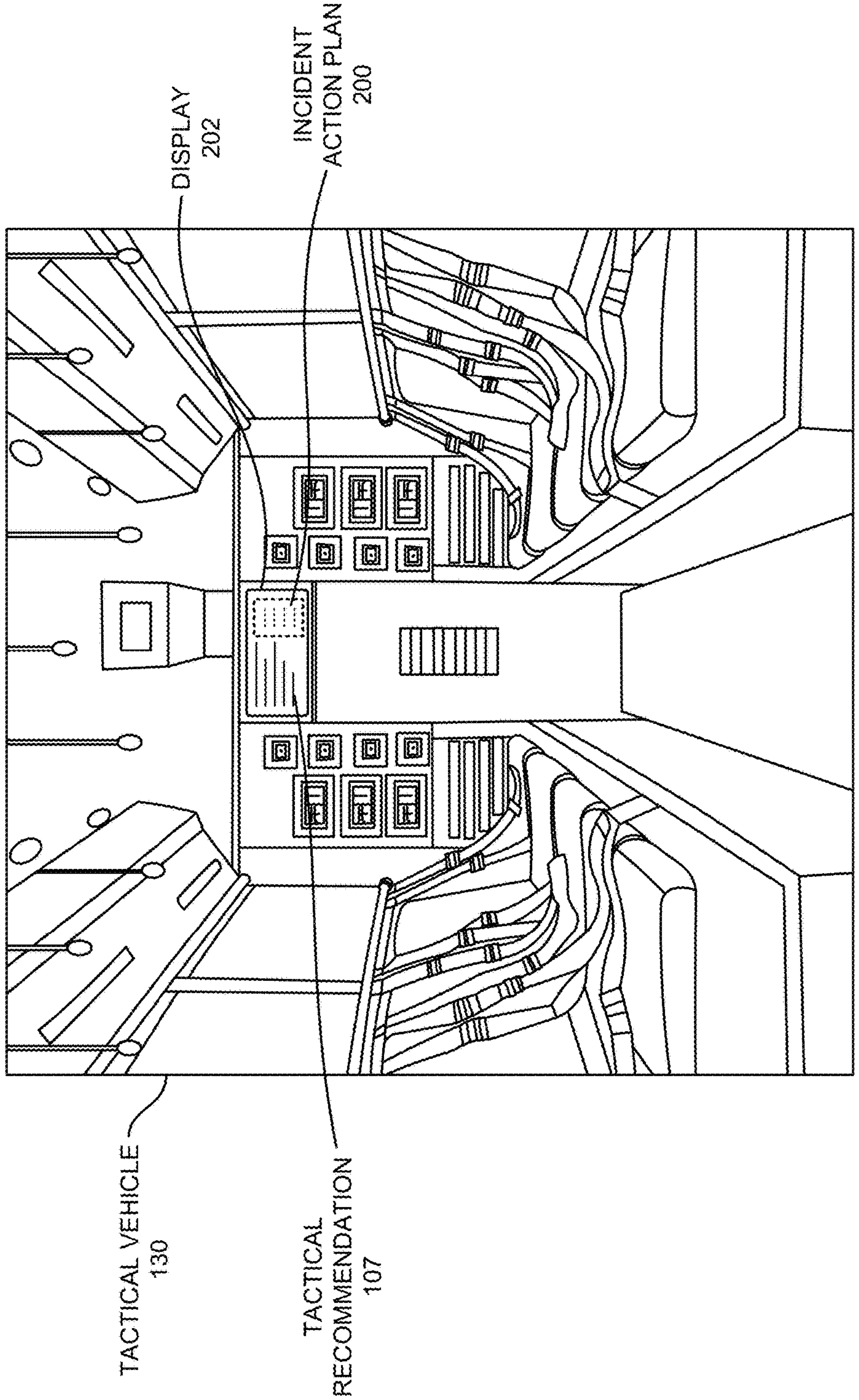
FIG. 2 is an interior view of the tactical vehicle of FIG. 1 illustrating a display exhibiting the incident action plan generated by the WAAIM, according to one embodiment.

FIG. 2 is an interior view 250 of a tactical vehicle 130 of FIG. 1 illustrating a display 202 exhibiting the incident action plan 200 generated by the WAAIM 102, according to one embodiment. The display 202 may be a screening device which allows a user (e.g., a soldier, battalion commander 106) to interact with a computer by touching areas on the screen. The incident action plan 200 generated by the Wearable Action Artificial-Intelligence Model ("WAAIM" 102) may be exhibited on the display 202 of the tactical vehicle 130 of FIG. 1. For example, the display 202 may be integrated into the tactical vehicle 130, and/or may be a tablet device and/or mobile phone application of the battalion commander 106, according to one embodiment.

FIG. 3 is an action view 350 showing a user interface of the display 202 in which different types of multiple communications 104 are associated with a different recommended actions (e.g., using tactical recommendation(s) 107), and an action indicator 304 embodying a button through which an action can be taken, according to one embodiment. In FIG. 3, an AI (Artificial Intelligence) of the Wearer Action Artificial-Intelligence Model ("WAAIM" 102) provides tactical recommendation(s) 107 to a battalion commander 106 based on various types of multiple communications 104 received during an emergency situation, such as during a hostile situation. Each row represents a different type of multiple communications 104 that might be encountered and/or captured by the wearable headphone 100, the AI's recommended action (e.g., using tactical recommendation(s) 107) in response to that communication, and the labels of action indicator 304 buttons provided to the battalion commander 106 for immediate decision-making, according to one embodiment.

Type of multiple communications 104 column categorizes the source or nature of the information received, such as direct hostility communications, emergency traffic indicating immediate protocol risks, ammunition resupply 306, medical supplies 308, fuel resupply 310, ration 312, request for reinforcements 314, engineering support 316, artillery support 318, intelligence update 320, communications equipment 322, logistics support 324 requests, and so on, according to one embodiment. This classification helps in understanding the context of the situation or request, according to one embodiment.

AI-Recommended Action: For each type of communication, the AI analyzes the information and suggests a specific course of action in the form of tactical recommendation 107, according to one embodiment. These actions are tailored to address the immediate needs or changes in the situation as communicated, according to one embodiment. For instance, recommending immediate resupply of ammunition in response to ammunition resupply 306 request, recommending sending medical supply in response to medical supplies 308 requests, recommending sending fuel resupply for combat vehicles in response to fuel resupply 310 requests, recommending immediate supply of food and water in response to ration 312 request, recommending dispatching of additional resources to support the combat team in response to the request for reinforcements 314, recommending deployment of engineers for repair works in the combat field in response to the engineering support 316 request, advising provision of artillery support in response to artillery support 318 request, recommending gathering updated intelligence on enemy positions via reconnaissance team in response to intelligence update 320 request, suggesting sending additional wearable microphones 100 and communications gear in response to communications equipment 322 request, recommending additional logistical support in response to logistics support 324 requests, adjusting deployment in response to ground communications or initiating emergency protocols by selecting the "initiate protocol" button for flashover risks, according to one embodiment.

Action Button Label: Corresponding to each recommended action, there are action button labels provided, according to one embodiment These labels represent the actions the battalion commander 106 can take with a simple tap on a touchscreen display 202, according to one embodiment. The options include proceeding with the AI's recommendation 302 and/or dismissing 305 it to take a different course of action, according to one embodiment. For example, the commander can choose to "Adjust Deployment" recommendation 302 based on the AI's suggestion or dismiss 305 the recommendation if deemed unnecessary.

The UX view of FIG. 3 is designed to streamline the decision-making process during emergencies by providing clear, actionable recommendations 302 that can be easily approved and/or modified by the battalion commander 106, according to one embodiment. This system enhances the efficiency and responsiveness of the command operations by leveraging AI to interpret complex situations and propose immediate actions, according to one embodiment.

Logistics Support 324 Requests: Communications regarding the need for additional resources, such as more personnel, equipment, ammunitions supply, and/or medical units may also be communicated. This includes requests for rescue teams or specific tools and materials necessary for the incident. The generative AI wearable headphone 100 may assist the battalion commander 106 in suggesting actions to take in response to logistical support 324 requests through the display 202, according to one embodiment. For example, the WAAIM 102 may generate an actionable recommendation 302 to call in more resources and/or personnel, according to one embodiment.

Air Support Coordination: If air support units are involved, such as helicopters or airplanes for ammunition drops or reconnaissance, communications will include coordination of these assets, including drop locations, flight paths, and times of operation. The generative AI wearable headphone 100 may assist the battalion commander 106 in suggesting actions to take in response to air support coordination through the display 202 (e.g., using the "coordinate air support" recommendation 302 of the action view 350), according to one embodiment. For example, the WAAIM 102 may generate a recommendation 302 to notify squad soldiers 146, according to one embodiment.

Inter-agency Communications for Intelligence Update 320: Information may be shared between different agencies involved in the incident, such as security services, local police, EMS, and other governmental or volunteer organizations (e.g., using the "facilitate coordination" recommendation 302 button of the action view 350). This can ensure a unified approach to the incident management. The generative AI wearable headphone 100 may assist the generating inter-agency communications by suggesting communications to be made to related agencies through the display 202, according to one embodiment. For example, the WAAIM 102 may generate an actionable recommendation 302 to notify local police of evidence of arson, according to one embodiment.

Public Information Announcements: Information intended for dissemination to the public, such as evacuation orders, road closures, shelter locations, and safety instructions may be received by the battalion commander 106. While not always directly broadcasted to the battalion commander 106, they need to be aware of these messages to manage the incident effectively, and the display 108 may exhibit this information from sources captured through other related radio and/or internet modalities, according to one embodiment.

Status Reports and Check-ins: Routine and/or scheduled reports from various units on the scene, providing updates on their status, activities, and any assistance they require, may be received by the battalion commander 106 through multiple communications 104. This may help maintain situational awareness and ensure the safety and accountability of all personnel involved. The generative AI wearable headphone 100 may assist in response to status reports and check-ins by suggesting customized acknowledgements to be sent as automated messages through display 202, according to one embodiment. For example, the WAAIM 102 may generate a customized timely thank you note or words of encouragement to a squad soldier 146 to acknowledge that their status update was heard and did not fall on deaf ears, according to one embodiment.

Mutual Aid Requests and Coordination: Communications involving the request for, or offer of assistance from neighboring jurisdictions and/or agencies may also be received by the battalion commander 106. This may include coordinating the arrival, deployment, and integration of these additional resources into the incident command structure. The generative AI wearable headphone 100 may assist in mutual aid requests and coordination by suggesting actions to be communicated to accept and/or decline these requests to be sent as automated messages through display 202 (e.g., using the "coordinate mutual aid" recommendation 302 of the action view 350), according to one embodiment. For example, the WAAIM 102 may generate an actionable recommendation 302 to accept and/or decline a request, according to one embodiment.

Incident Action Plans (IAP) Updates may be automatically generated through the WAAIM 102: Recommendations 302 related to the overall strategy and objectives, including any updates to the Incident Action Plan 200 (e.g., using the "update plans" recommendation 302 of action view 350) based on what can be heard and interpreted through the generative AI wearable headphone 100, according to one embodiment. This can involve shifts in tactics, new operational periods, and/or changes in command structure. These broadcasts (e.g., multiple communication 104) are vital for the battalion commander 106 to maintain a comprehensive understanding of the situation, make informed decisions, and ensure the safety and effectiveness of the response efforts, according to one embodiment.

In response to a confirmation on the display 202 (e.g., a tap on a touchscreen display using recommendation 302 or dismiss 305 of the action indicator 304) or verbal acceptance from the battalion commander 106 communicated to the WAAIM 102 through the generative AI wearable headphone 100, responsive actions to address the various multiple communications 104 described herein may be taken automatically through dispatch center 112 and automatic execution of operations and instructions through artificial intelligence, according to one embodiment.

Figure 4:
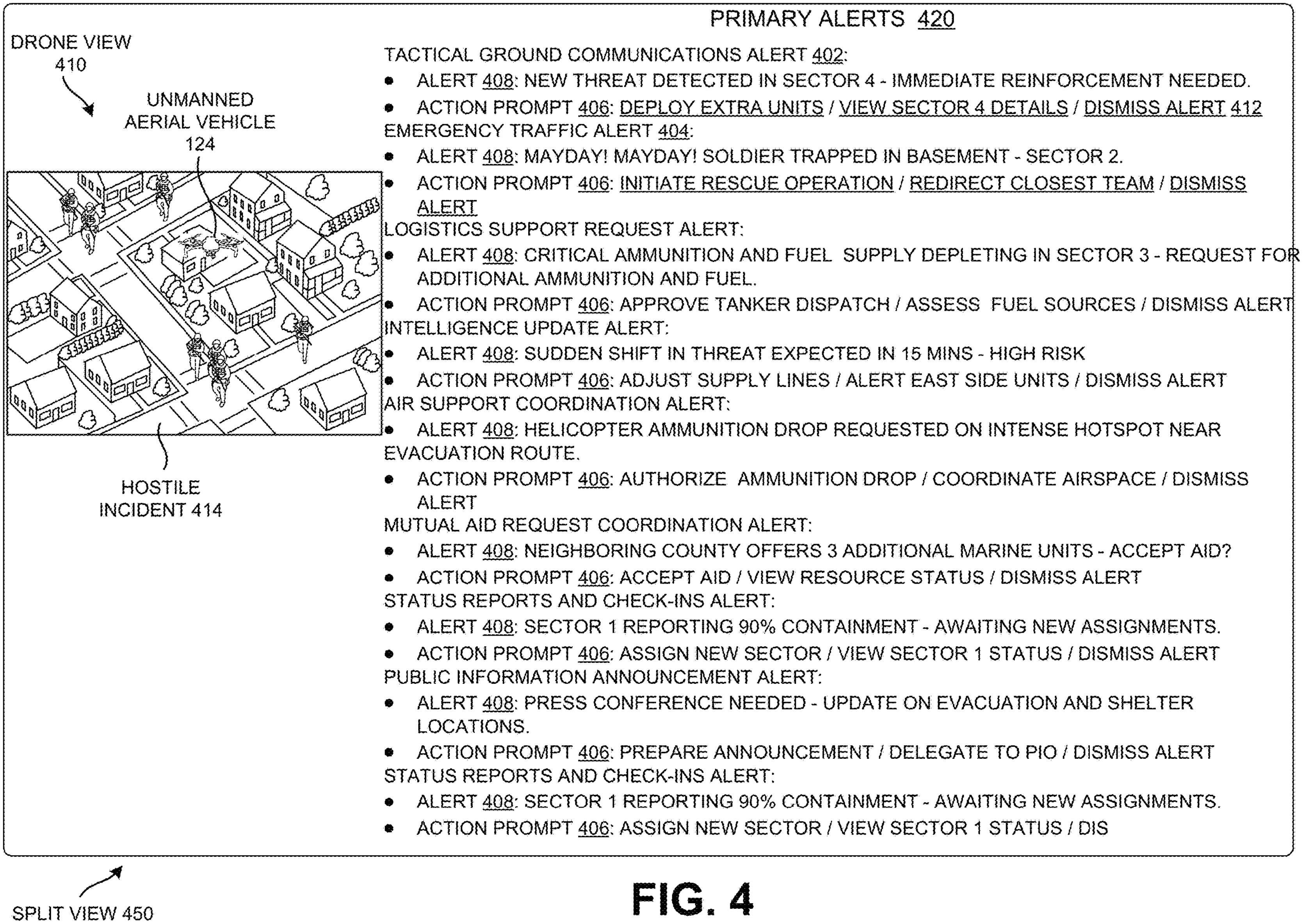
FIG. 4 is a split view illustrating a user interface of the display in which a live video feed from the unmanned aerial vehicle of FIG. 1 is shown on the left side of the display, with alerts and recommended actions on the right side of the display, according to one embodiment.

FIG. 4 is a split view 450 illustrating a user interface of the display 202 in which a live video feed 121 from the unmanned aerial vehicle 124 is shown on the left side of the display 202, with primary alerts 420 and recommended actions on the right side of the display 202, according to one embodiment. The drone view 410 showing information from the unmanned aerial vehicle (UAV) 124 observing a hostile incident 414 in progress offers significant advantages to a battalion commander 106 in managing the emergency response efforts. The importance of this aerial perspective encompasses several key aspects of incident management for enhanced situational awareness to generate recommendations 302 through the WAAIM 102 described below:

Real-Time Monitoring: UAV 124 can transmit live video feeds 121, providing the WAAIM 102 with an up-to-the-minute view of the attack's extent, behavior, and progression. This real-time monitoring can help the WAAIM 102 understand threat dynamics and recommend informed decisions to the battalion commander 106, according to one embodiment.

Comprehensive Overview: A drone view 410 can offer a bird's-eye perspective that ground units cannot achieve, allowing the WAAIM 102 to grasp the overall scale and scope of the incident. It helps the WAAIM 102 in recommending actions related to mission fronts, hotspots, and potential spread paths to the battalion commander 106, according to one embodiment.

Squad Safety: UAV 124 can be used to identify safe routes for soldiers to enter and exit the affected area, locate stranded personnel, and monitor changing conditions that can pose new risks. This can help the WAAIM 102 in making recommendations to minimize exposure to threat and hazardous conditions, according to one embodiment.

Hazard Identification: Drones can detect threats and risks involving hazards such as structural instabilities, explosive materials, and risks like chemical attack or leaks and/or electrical dangers, enabling the WAAIM 102 to recommend that the battalion commander 106 warn ground units and prevent accidents, according to one embodiment.

Efficient Resource Allocation: By providing a clear view of the hostile attack and affected areas, drones may help the WAAIM 102 in recommending that a security department deploy resources (e.g., personnel, equipment, tactical sources, etc.) more strategically (e.g., using "authorize resources" 302 of the action view 350). It ensures that efforts are concentrated where they are needed most, optimizing the use of available resources, according to one embodiment.

Logistics Coordination: The aerial imagery can assist in identifying accessible roads, security resources, and staging areas, helping the WAAIM 102 to provide recommendations to facilitate logistics coordination and ensuring that supplies and reinforcements reach the right location promptly, according to one embodiment.

Incident Analysis and Planning: UAV 124 footage can help in analyzing the attacker's behavior, including the intensity/location of threat, response to security efforts, and the influence of ambient conditions. This analysis can be vital for the WAAIM 102 making recommendations 302 for planning containment strategies and predicting future movements, according to one embodiment.

Evacuation and Public Safety: Drone footage from the UAV 124 can aid the WAAIM 102 in providing recommendations 302 to the battalion commander 106 to assess which areas are most at risk, enabling timely evacuation orders and public safety announcements. The WAAIM 102 can also directly generate communication with the public by providing accurate, visual information about the incident's impact, according to one embodiment.

In summary, integrating drone technology into the WAAIM 102 offers transformative potential. It enhances situational awareness, improves safety, facilitates efficient resource use, supports strategic planning, and aids in public communication. For battalion commanders 106, UAV 124 may be an invaluable tool that contributes to more effective and informed decision-making during emergency situations, according to one embodiment.

On the right side of FIG. 4 are some creative examples of alerts (e.g., primary alerts 420) and action prompts that might appear on a battalion commander's display 108, designed to engage immediate decision-making and action for various scenarios during a hostile incident 414, according to one embodiment.

Alert 408 Section: This part of the display 108 shows the alert type and a brief description 122 of the situation. Each alert can be categorized to help the battalion commander 106 quickly understand the nature of the alert, such as "Tactical ground Communications Alert" 402 or "Emergency Traffic Alert" 404, according to one embodiment Action Prompts 406: Adjacent to or directly below each alert, there are actionable options presented as buttons or links, according to one embodiment. These prompts offer the battalion commander 106 immediate decision-making capabilities, such as "Deploy Extra Units," "Initiate Rescue Operation," or "Approve Ammunition Dispatch." The options are straightforward, enabling a rapid response with just a tap or click, according to one embodiment.

Dismiss Option: Alongside the actionable prompts, a "Dismiss Alert" 412 option can be always present, allowing the commander to quickly clear alerts that have been addressed or deemed non-critical, keeping the interface uncluttered and focused on priority tasks, according to one embodiment.

Additional Information: Some alerts offer the option to view more details, such as "View Sector 4 Details" or "View Park Map," providing in-depth information for more informed decision-making, according to one embodiment. This interface can be designed to not only facilitate quick actions but also to support deeper analysis when necessary, according to one embodiment.

In summary, integrating drone technology into WAAIM 102 offers transformative potential. It enhances WAAIM 102 situational awareness, improves safety, facilitates efficient recommendations to the battalion commander 106 for resource use, supports strategic planning, and aids in public communication. For battalion commanders, UAVs 124 are invaluable tools that contribute to more effective and informed decision-making during emergencies, according to one embodiment.

Figure 5:
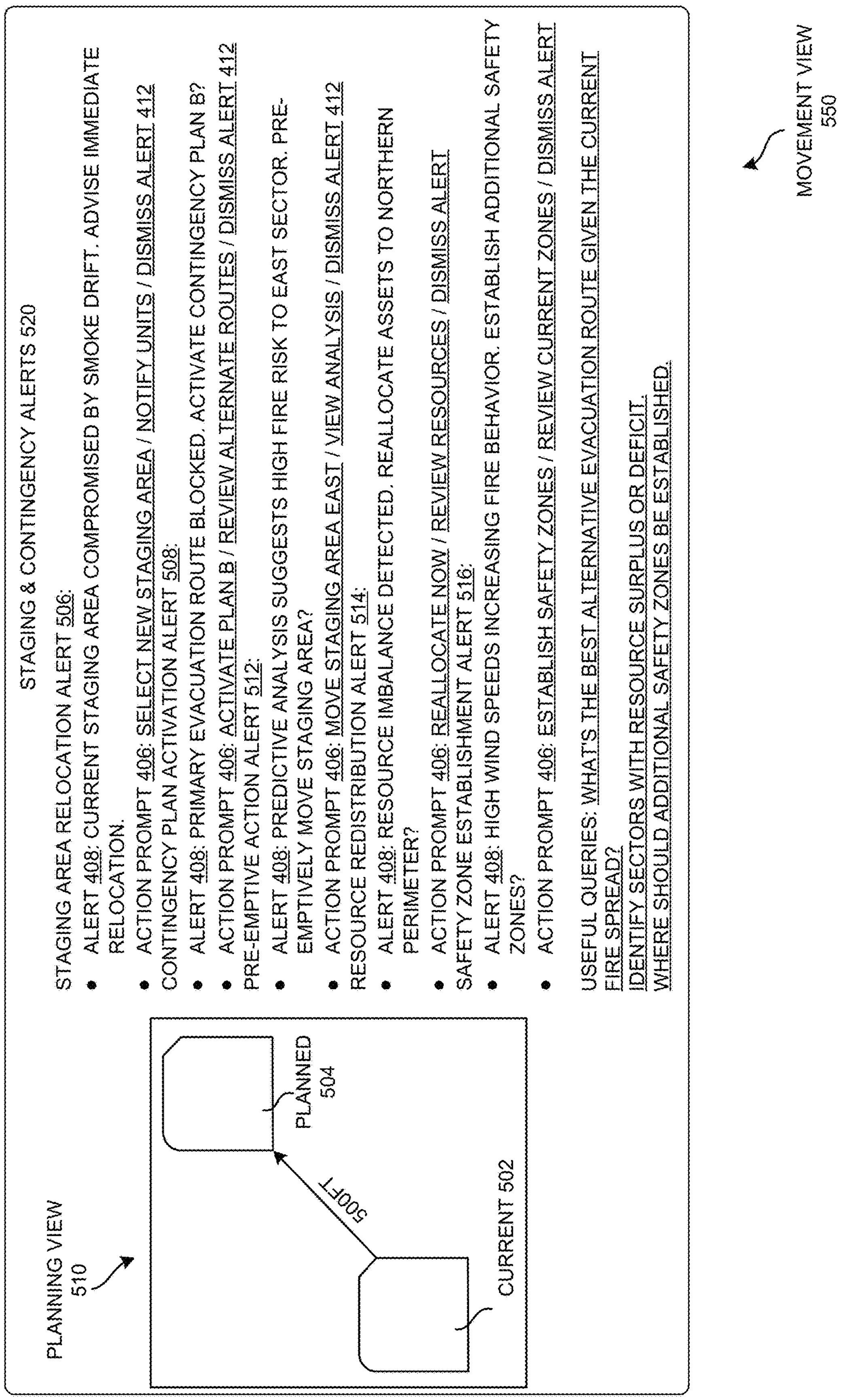
FIG. 5 is a movement view illustrating a user interface of the display in which movements associated with a staging area are shown on a left side of the display, with alerts and recommended actions related to staging changes on the right side of the display, according to one embodiment.

FIG. 5 is a movement view 550 illustrating a user interface of the display 202 in which movements associated with a staging area are shown on a left side of the display 202, with alerts and recommended actions related to staging changes on the right side of the display 202, according to one embodiment. For example, the user interface may display a planning view 510 showing the current 502 location of the rescue and evacuation personnel (e.g., battalion commander 106, company commander 110, etc.) with a recommendation 302 of a planned 504 location for a swift movement of the rescue personnel on receiving an alert of attackers spreading to the current 502 location.

Alert 408 Section: This part of the staging and contingency alerts 520 in the display 202 shows the alert type and a brief description of the situation. Each alert can be categorized to help the battalion commander 106 quickly understand the nature of the alert, such as "Staging Area Relocation Alert" 506, "Contingency Plan Activation Alert" 508, "Pre-emptive Action Alert" 512, "Resource Redistribution Alert" 514, or a "Safety Zone Establishment Alert" 516, according to one embodiment Action Prompts 406: Adjacent to or directly below each alert, there are actionable options presented as buttons or links, according to one embodiment. These prompts may offer the battalion commander 106 immediate decision-making capabilities, such as "Deploy Extra Units," "Initiate Rescue Operation," or "Approve Tanker Dispatch." The options are straightforward, enabling a rapid response with just a tap or click, according to one embodiment.

Dismiss Option: Alongside the actionable prompts 406, a "Dismiss Alert" 412 option may allow the commander to quickly clear alerts that have been addressed or deemed non-critical, keeping the interface uncluttered and focused on priority tasks, according to one embodiment.

Figure 6:
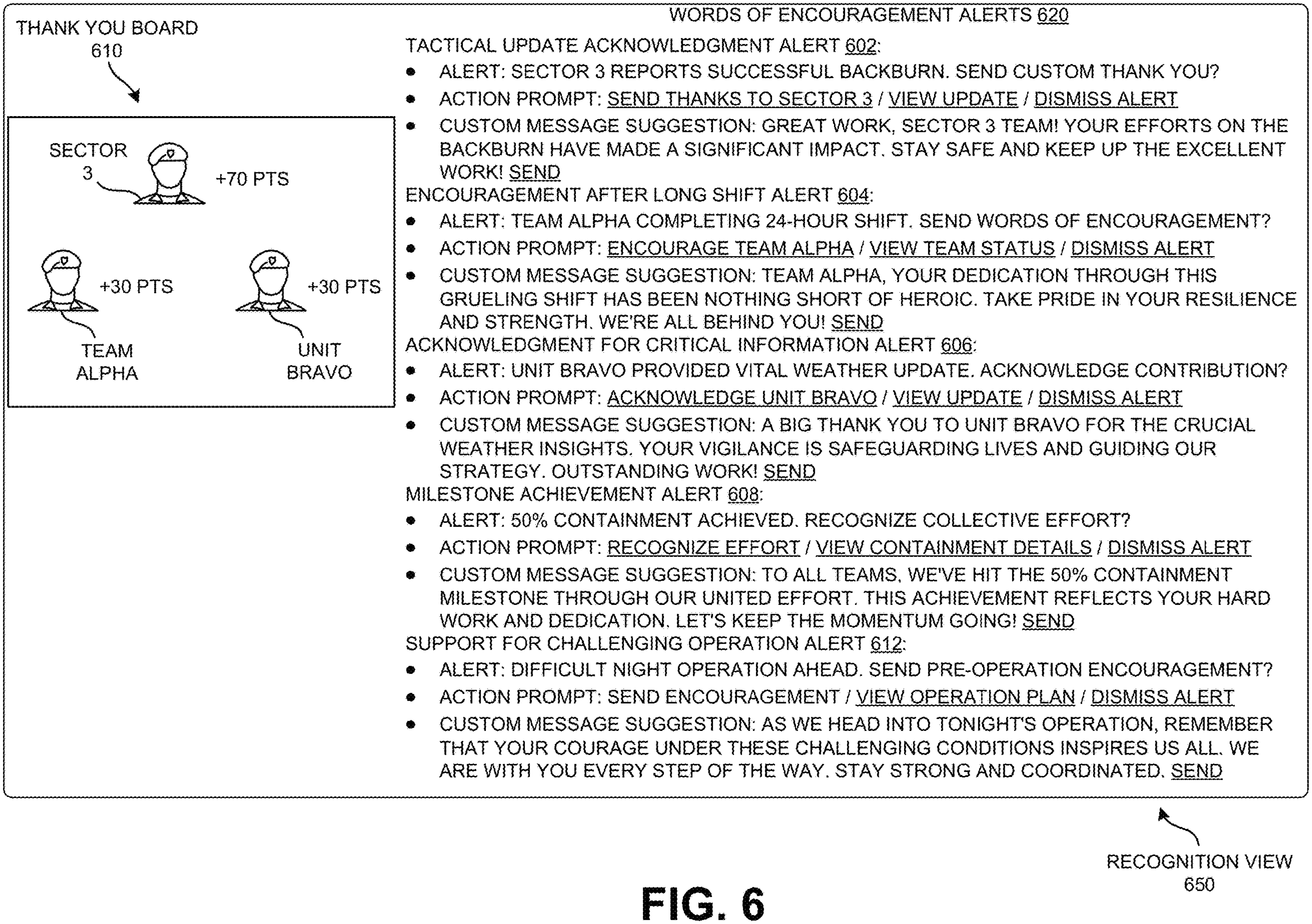
FIG. 6 is a recognition view illustrating a user interface of the display in which a thank you leader board is shown on a left side of the display, with opportunities to give recognition are shown on the right side of the display, according to one embodiment.

FIG. 6 is a recognition view 650 illustrating a user interface of the display in which a thank you leader board is shown on a left side of the display, with opportunities to give recognition are shown on the right side of the display, according to one embodiment. FIG. 6 illustrates an innovative feature integrated into the incident command system, specifically focusing on morale and recognition within military and police teams. This feature can be divided into two main components: the "Thank You Board" 610 and the "Words of Encouragement Alerts" 620, each designed to enhance team spirit and acknowledge the hard work of squad soldiers 146.

The thank you board 610 may serve as a digital recognition platform to highlight and commend the achievements and efforts of squad soldiers 108 who have demonstrated exceptional skill, bravery, or dedication during an incident, according to one embodiment.

The thank you board 610 may display names or units of soldiers alongside descriptions of their commendable actions. It might also include the date, specific incident details, and the impact of their contributions, according to one embodiment.

The battalion commander 106 can update the thank you board 610 in real-time, adding acknowledgments as achievements occur. This feature likely supports touch interaction or voice commands for ease of use, according to one embodiment.

Words of encouragement alerts 620 may help customizable thank yous and words of encouragement alerts to be sent. This section generates specific alerts prompting the battalion commander 106 to send customized thank you messages or words of encouragement based on recent actions, achievements, or the completion of demanding tasks by the teams, according to one embodiment.

Tactical update acknowledgment alert 602 may suggest sending a custom thank you to a team or unit for a successful operation, such as a backburn, providing a preset message that can be personalized and sent directly from the interface, according to one embodiment.

Encouragement after a long shift alert 604 may offer a prompt to send a message of encouragement to teams who have completed particularly long or difficult shifts, acknowledging their hard work and dedication, according to one embodiment.

Acknowledgement for critical information alert 606 may alert the battalion commander 106 to recognize individuals or units that have provided vital information, such as weather updates, that contribute significantly to the operation's success, according to one embodiment.

Milestone achievement alert 608 may suggest acknowledging collective efforts when significant milestones, like containment percentages, are achieved, fostering a sense of unity and shared success, according to one embodiment.

Support for challenging operation alert 612 may provide prompts for sending pre-operation encouragement, especially before undertaking challenging tasks, emphasizing support and confidence in the teams' abilities, according to one embodiment.

This recognition view 650 interface is user-friendly, with clear, readable text and intuitive navigation, according to one embodiment. Alerts 408 and prompts are designed to catch the battalion commander's 106 attention without overwhelming them with information. Through this system, the battalion commander 106 can quickly and easily send out messages of acknowledgement and encouragement, ensuring that soldiers feel valued and supported. This not only boosts morale but also reinforces the culture of recognition and appreciation within the team. By maintaining high morale, the system indirectly contributes to operational efficiency and safety. A motivated team can be more cohesive, communicates better, and performs more effectively in high-pressure situations. Regular acknowledgment and encouragement help build a positive work environment, crucial for sustaining motivation and resilience during prolonged and difficult incidents. FIG. 6 represents a thoughtful integration of human-centric features into emergency response technology, acknowledging that beyond strategy and logistics, the emotional well-being and recognition of first responders (e.g., a company commander 110, a squad soldier 146) play a critical role in the overall success of incident management, according to one embodiment.

FIG. 7 is a local view 750 illustrating a user interface of the display 202 in which different scenarios are associated with different multiple communications 104 amplified using the wearable microphone 100 along with an AI-generated recommendation 704 (e.g., using tactical recommendation 107), according to one embodiment. FIG. 7 illustrates a local view 750 of the user interface (UI) for the battalion commander 106, focusing on the interaction between scenario awareness, incoming multiple communications 104, and AI-generated recommendation 704 (e.g., using tactical recommendation 107) for action. This UI can be designed to optimize the battalion commander's decision-making process by integrating real-time data with artificial intelligence insights. Scenario 702 displays the current scenario or incident type the commander can be dealing with, such as a gunfire, terrorist attack, hostage crisis, hazardous material spill, explosion, etc. This section sets the context for the multiple communication 104 and subsequent AI-generated recommendation 704 (e.g., using tactical recommendation 107). It helps to quickly orient the battalion commander 106 to the nature of the incident, providing a high-level overview that can influence decision-making priorities.

Multiple communication 104 shows a transcription 125 and description 122 of recent communications related to the scenario. This can include updates from field units, emergency traffic, logistics requests, and more. Multiple communication 104 as shown in FIG. 7 offers real-time insights into the unfolding situation, highlighting immediate concerns, progress reports, or calls for assistance. It ensures the battalion commander 106 can be aware of the latest developments on the ground. AI-generated recommendation 704 generated by the WAAIM 102, which analyzes the current scenario and multiple communication 104 to suggest actionable responses. AI-generated recommendation 704 provides specific recommendations or actions the battalion commander 106 should consider in response to the latest updates. This can involve adjusting tactics, deploying additional resources, initiating evacuations, etc. The AI-generated recommendation 704 leverages AI to process complex data and generate insights, potentially identifying patterns or risks that might not be immediately obvious to human operators. It supports the battalion commander 106 by suggesting data-driven decisions (e.g., using the generative data-driven decisions 1112) that enhance response effectiveness, according to one embodiment.

This user interface design, as depicted in FIG. 7, aims to enhance situational awareness, streamline communication, and facilitate quick, informed decision-making during emergency incidents. By combining the context of the current scenario, direct input from the field, and AI-powered analysis, the system provides a comprehensive tool for battalion commanders to manage emergencies more effectively. The integration of AI-generated recommendation 704 allows for a dynamic response to changing conditions, ensuring that strategies and resource allocations (e.g., using the AI foundation models of resource allocation knowledge 1104 of the generative AI reshaping the future 1100 integrated with the WAAIM 102) are always aligned with the most current information. This approach not only improves operational efficiency but also contributes to the safety and success of emergency response efforts, according to one embodiment.

Figure 8:
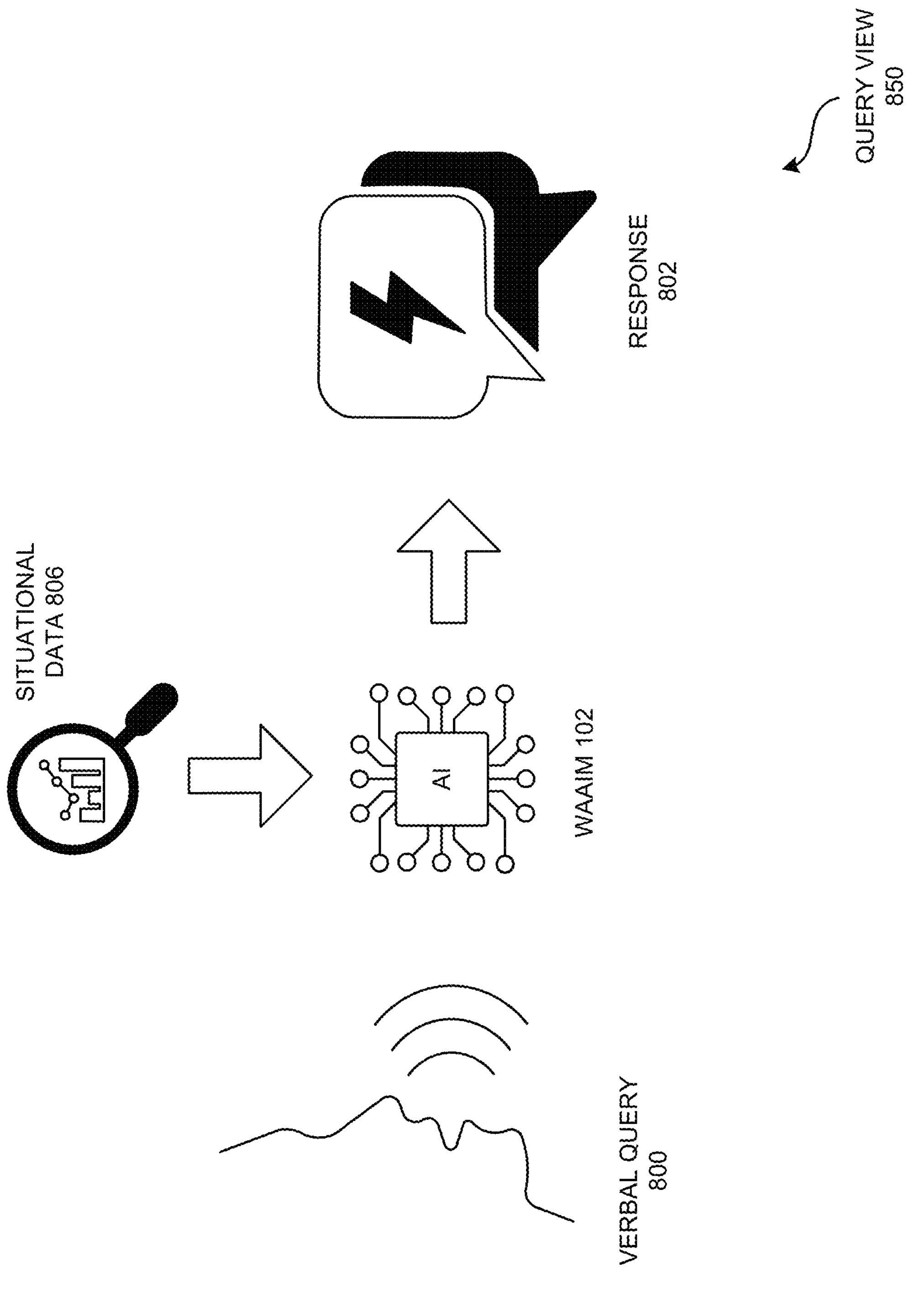
FIG. 8 is a query view illustrating the generation of a response based on a verbal query to the generative AI wearable microphone, according to one embodiment.

FIG. 8 is a query view 850 illustrating the generation of a response 802 based on a verbal query 800 to the generative AI wearable microphone 100, according to one embodiment. FIG. 8 illustrates the graphical feature of the generative AI wearable microphone 100, specifically focusing on how the device handles and responds to verbal queries from the battalion commander 106. This query view 850 illustrates the process from the initiation of a verbal query 800 to the delivery of a generated response 802, showcasing the AI's ability to interpret, analyze, and provide actionable information in real-time. The verbal query 800 serves as the interface for interacting with the generative AI wearable microphone 100 via voice commands. This query view 850 captures the battalion commander's 106 verbal query 800 and displays the corresponding AI-generated response 802. The query view 850 can operate on the display 202, or without a display through a speaker on the generative AI wearable microphone 100. On the display 202, the query view 850 can be designed for clarity and ease of use, ensuring that verbal queries can be easily made and that responses are displayed in a readable and actionable format.

The battalion commander 106 activates the voice recognition feature of the generative AI wearable microphone 100, possibly using a specific wake word and/or pressing a button, and then states their query aloud. This query can range from requesting updates on specific incidents, asking for resource status, seeking advice on tactical decisions, or inquiring about threats affecting the incident. The AI system captures the verbal query 800, processes the spoken words using natural language processing (NLP) technology, and interprets the commander's intent to formulate a relevant query for the AI model 140 to analyze, according to one embodiment.

Once the query can be understood, the AI model 140 analyzes the available data, considers the current context of the incident, and generates a response 802. This involves tapping into various data sources and utilizing predictive models (e.g., using prediction model 1070 of the AI-powered incident action plan optimization and visualization system 1000), historical data, and real-time information to provide the most accurate and useful answer. The generated response 802 can be then displayed in the query view 850 for the battalion commander 106 to review (e.g., using the "review status" recommendation 302 button of the action view 350). The response 802 can be structured to be direct and actionable, offering clear guidance, information, or recommendations 302 based on the query. The interface may allow the battalion commander 106 to interact further with the response 802, such as asking follow-up questions, requesting more detailed information, or taking direct action based on the recommendations 302 provided, according to one embodiment.

This functionality of the query view 850 significantly enhances the decision-making capabilities of the battalion commander 106 by providing instant access to a wealth of information and expert analysis. It allows for a dynamic and informed response to evolving situations, ensuring that command decisions are supported by the latest data and AI insights. The ability to interact verbally with the AI system streamlines communication, making it quicker and more intuitive for battalion commanders 106 to obtain the information they need, especially in the heat of an emergency when time can be of the essence, according to one embodiment.

FIG. 9 is a query view 950 illustrating useful queries that might be possible to the generative AI wearable microphone 100 for different types of communications 900, according to one embodiment. Particularly, FIG. 9 depicts a comprehensive user interface (UI) within the system of the AI enabled wearable microphone 100, specifically designed to facilitate interaction between the battalion commander 106 and the AI system regarding various types of communications 900 during a hostile incident 1102. This UI can be aimed at streamlining the process of obtaining actionable intelligence and making informed decisions. Types of communication 900 categorizes and lists the different types of communications that the battalion commander 106 might receive during hostile incidents 1102, such as hostile communications, emergency traffic, logistics support 324 requests, and more. By categorizing communications, the system enables the battalion commander 106 to quickly navigate and focus on specific areas of interest or concern, enhancing the efficiency of information management.

Transcription 125 displays the actual messages or summaries of communications received via the wearable microphone 100. This can include live updates from soldiers on the ground, emergency calls, and/or logistical requests. The real-time display of communications 900 provides immediate insights into the evolving situation, allowing the battalion commander 106 to stay updated with the most current information, according to one embodiment.

Useful queries 902 shows query generation in action—in other words, based on the types of communication 900 and the specific transcription 125 messages received, the UI suggests useful queries that the battalion commander 106 might want to ask the AI system. These queries are tailored to extract further insights or actionable information related to the received communications. The battalion commander 106 can select or voice these queries directly to the AI system, which then processes the requests and provides answers and/or recommendations (e.g., tactical recommendation 107). The system likely uses natural language processing (NLP) to understand and respond to the queries effectively, according to one embodiment.

The UI can be designed to be highly intuitive, with clear labels and easy navigation to ensure that during the stress of incident command, the commander can quickly find and use the features needed. Given the dynamic nature of hostile incidents 414, the UI can be built to update in real-time, ensuring that the displayed information and suggested queries always reflect the current situation. The system may allow for customization of the query suggestions based on the preferences or prior queries of the battalion commander 106, enhancing the relevance of the information provided, according to one embodiment.

FIG. 9 represents a sophisticated integration of communication analysis and AI-driven query suggestion, significantly aiding battalion commanders 106 in rapidly digesting incoming information and formulating queries that lead to actionable insights. This setup ensures that decision-making can be informed, timely, and based on a comprehensive understanding of the incident dynamics, ultimately contributing to more effective incident management and response efforts (e.g., using the generative innovation in response generation 1108 of the generative AI reshaping the future 1100), according to one embodiment.

Figure 10:
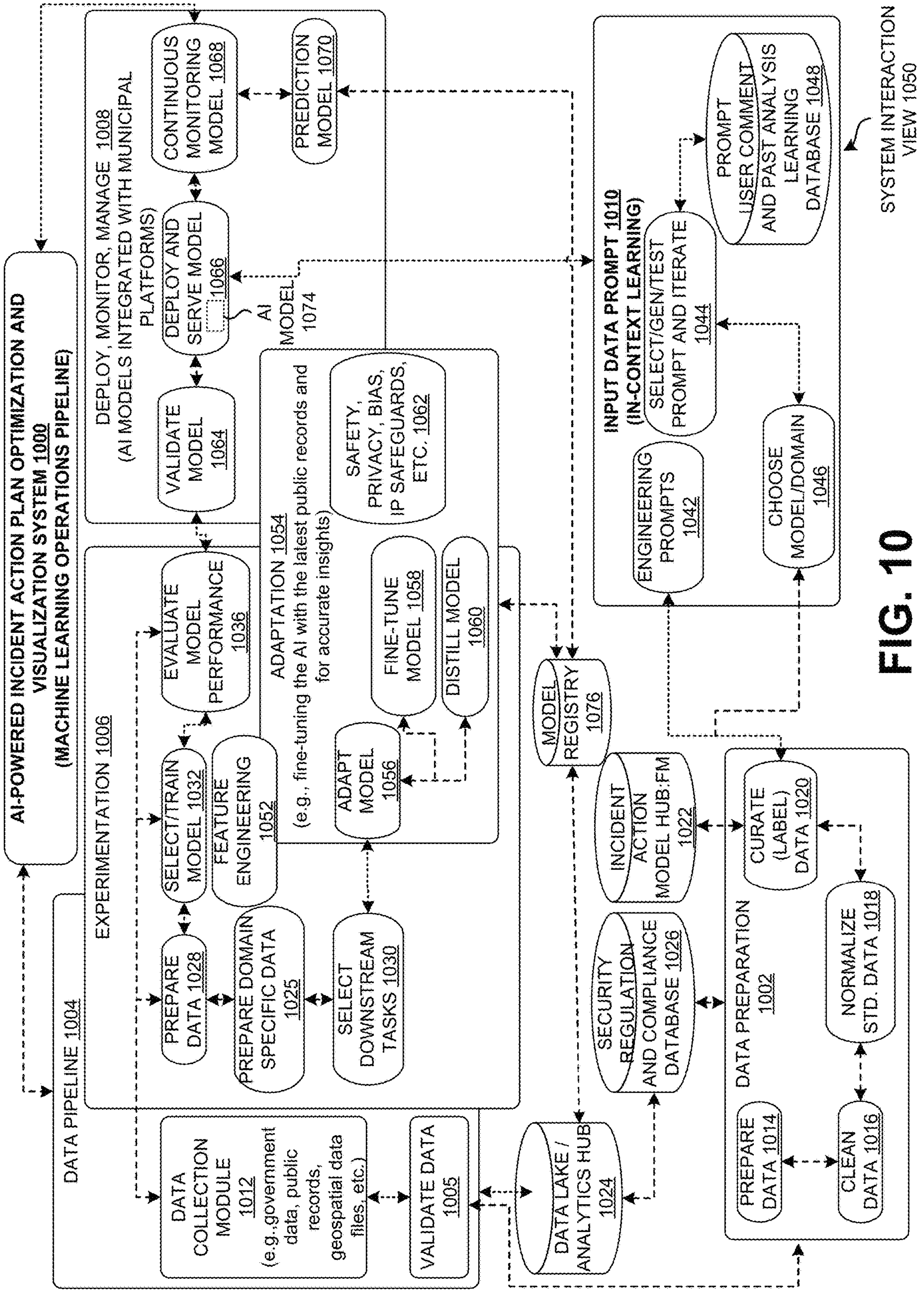
FIG. 10 is a system interaction view of an AI-powered incident action plan optimization and visualization system of the WAAIM illustrates a series of steps that transform an aggregate situational data into actionable insights for modifying the incident action plan, according to one embodiment.

FIG. 10 is a system interaction view 1050 of an AI-powered incident action plan optimization and visualization system 1000 using the WAAIM 102 illustrates a series of steps that transform an aggregate situational data into actionable insights for modifying the incident action plan 200, according to one embodiment. FIG. 10 is a visual representation of the complex process of developing and implementing generative AI model 1074 in the context of GovGPT AI. The life cycle can ensure that the system not only suggests optimal incident action but also provides users with economic feasibility insights and the ability to manage military and police resources. Here's a summary of each element:

Data Pipeline 1004: Involves collecting and validating data, which then flows into a data lake and/or analytics hub 1024 and feature store for subsequent tasks. Data Pipeline 1004 can involve collecting and validating emergency situation data, zoning laws, and local ordinances relevant to security management, according to one embodiment.

The data pipeline 1004 may be a series of steps that transform raw government data into actionable insights for managing hostile incidents in compliance with complex state and municipal security regulations using artificial intelligence techniques. The raw government data may encompass public records, geospatial data, intelligence, enemy threat details, state security codes, and municipal regulations, etc. that may be utilized to create generative AI models 1074 for automating the security operations followed by suggesting the optimal resource management plan, according to one embodiment.

The generative AI models 1074 for automating the incident action plan 200 of the disclosed system may include the process of collecting, processing, and transforming raw government data into a format that can be used to train and deploy machine learning models. An AI model 1074 related to resource allocation planning and development may include various stages such as collecting the hostile incident data (e.g., using data collection module 1012), verifying the data (e.g., using validate data 1005), preprocessing the data for removing the errors in the data (e.g., using prepare data 1028), extracting valuable information from the data for the AI model (e.g., using prepare domain specific data 1025), labeling the data, using the preprocessed and labeled data to train the AI model 1074 (e.g., using select/train model 1032), assessing the performance of the trained model using validation datasets (e.g., using evaluate model performance 1036 of experimentation 1006), and integrating the trained model into a system and/or an application that can make predictions on new incident action plans (e.g., using deploy and serve model 1066 and prediction model 1070), according to one embodiment.

The AI-powered incident action optimization and visualization system 1000 may use data collection module 1012 to collect data from external sources such as public records (e.g., zoning regulation, etc.), GIS data (e.g., topographical data), and/or emergency situations data (e.g., accidental events, gunfire, demographics, etc.), according to one embodiment.

The AI-powered incident action optimization and visualization system 1000 may be ingested with data collected from external and internal sources (e.g., using data lake and/or analytics hub 1024) including the geographical information, security threat records, zoning regulations, associated risk data, and any other relevant information related to the hostile incidents. The system may further acquire satellite imagery, maps, and/or other geospatial data that can provide a detailed view of the hostile area. The system may automatically identify a shape file, and consult the relevant data, including any specific regulatory requirements applicable to the location of the hostile event. The system may gather a diverse and representative dataset of intricate landscape from security regulation and compliance database 1026 including the local safety codes, zoning maps, security regulations, state and municipal security regulations, accessibility requirements, and safety considerations, etc. that reflects the characteristics of the task the AI powered generative model 1074 can be designed for (e.g., using prediction model 1070 from deploy, monitor, manage 1008), according to one embodiment.

The system may ensure that the dataset covers a wide range of scenarios, variations, and potential inputs that the model may encounter including any specific regulatory requirements applicable to military and police safety compliance, etc. The system may validate data 1005 to check for missing values and inconsistencies in the data collected from the internal and external sources to ensure that the data quality meets the AI model requirements (e.g., using data preparation 1002), according to one embodiment.

Experimentation 1006: This phase includes preparing data, engineering features, selecting and training models, adapting the model, and evaluating the model's performance. Experimentation 1006 can encompass the AI analyzing different emergency situation scenarios against the collected data to suggest the best ways to allocate the resources, according to one embodiment.

The experimentation 1006 phase of the data pipeline 1004 of the AI-powered incident action optimization and visualization system 1000 may include preparing data 1028 for feature engineering 1052, extracting and/or preparing domain specific data 1025, and selecting downstream task 1030. The feature engineering 1052 may be the manipulation—addition, deletion, combination, mutation—of the collected data set to improve machine learning model training, leading to better performance and greater accuracy. The feature engineering 1052 may help extract relevant features from the collected data using the data collection module 1012 (e.g., hostile incidents 1102, proximity to amenities, GPS location of the wearer 116, etc.) from situational data. It may further expand the dataset through data augmentation by artificially increasing the training set to create modified copies of a dataset from existing data to improve model performance. The preparing domain specific data 1025 may include domain-specific knowledge and/or constraints (e.g., zoning requirements for mitigating hostile incidents, environmental regulations, etc.) for a particular geographical area derived from the security regulation and compliance database 1026. The feature engineering 1052 may be the design features that capture the relevant information for the chosen downstream task 1030 and may select features that are informative and robust to noise. The select downstream task 1030 may define the specific task a model will perform. For example, the select downstream task 1030 may define the task of generating the incident action plan 200 for a specific AI model 1074 in the data pipeline 1004. In another example embodiment, the select downstream task 1030 may define the task of identifying optimal incident action, etc. for a particular AI model 1074 in the data pipeline 1004. The feature engineering 1052 may be the process of extracting features from raw data received through the data collection module 1012 to support training a downstream statistical model. The process may select and transform variables when creating a predictive model 1070 using machine learning for solving a problem received by the AI-powered incident action optimization and visualization system 1000. The select/train model 1032 in the experimentation 1006 phase may choose an appropriate AI generative language model for a particular task by considering factors like task complexity, data size, and/or computational resources, etc. In the next step of experimentation 1006 phase, the model may be trained on a portion of data to evaluate the model's performance 1036 on a separate test set. The test results may be analyzed to identify areas of improvements to improve the model's performance, according to one embodiment.

In the adaptation 1054 phase, the machine learning models may adapt and improve their performance as they are exposed to more data by fine tuning (e.g., using the fine-tune model 1058) the adapted model 1056 for a specific situational event domain and include additional domain specific knowledge. The adapted model 1056 may modify the model architecture to better handle a specific task. The fine-tune model 1058 may train the model on a curated dataset of high-quality data by optimizing the hyperparameters to improve model performance. The distilled model 1060 may simplify the model architecture to reduce computational cost by maintaining and improving model performance. The system may implement safety, privacy, bias and IP safeguards 1062 to prevent bias and discrimination while predicting an incident action plan 200. The system may ensure model outputs are fair and transparent while protecting the sensitive data as well, according to one embodiment.

The data preparation 1002 may be the process of preparing raw geographical and incident action data extracted from the data lake and/or analytics hub 1024 based on the prompt received from a user (e.g., squad soldier 108, company commander 110, informant 132, etc.) so that it can be suitable for further processing and analysis by the AI-powered incident action optimization and visualization system 1000. The data preparation 1002 may include collecting, cleaning, and labeling raw data into a form suitable for machine learning (ML) algorithms and then exploring and visualizing the data. The data preparation 1002 phase may include prepare data 1014, clean data 1016, normalize standardized data 1018, and curate data 1020. The prepare data 1014 may involve preprocessing the input data (e.g., received using the data collection module 1012) by focusing on the data that can be needed to design and generate a specific data that can be utilized to guide data preparation 1002. The prepared data 1014 may further include conducting geospatial analysis to assess the physical attributes of each area of hostile incident occurrence, zoning regulations, and neighborhood delineations, etc. In addition, the prepared data 1014 may include converting text to numerical embeddings and/or resizing images for further processing, according to one embodiment.

The clean data 1016 may include cleaning and filtering the data to remove errors, outliers, or irrelevant information from the collected data. The clean data 1016 process may remove any irrelevant and/or noisy data that may hinder the AI-powered incident action optimization and visualization system 1000, according to one embodiment.

The normalize standardized data 1018 may be the process of reorganizing data within a database (e.g., using the data lake and/or analytics hub 1024) of the AI-powered incident action optimization and visualization system 1000 so that the AI model 1074 can utilize it for generating and/or addressing further queries and analysis. The normalize standardized data 1018 may the process of developing clean data from the collected data (e.g., using the collect data module 1012) received by the database (e.g., using the data lake and/or analytics hub 1024) of the AI-powered incident action optimization and visualization system 1000. This may include eliminating redundant and unstructured data and making the data appear similar across all records and fields in the database (e.g., data lake and/or analytics hub 1024). The normalized standardized data 1018 may include formatting the collected data to make it compatible with the AI model 1074 of the AI-powered incident action optimization and visualization system 1000, according to one embodiment.

The curated data 1020 may be the process of creating, organizing and maintaining the data sets created by the normalized standardized data 1018 process so they can be accessed and used by people looking for information. It may involve collecting, structuring, indexing and cataloging data for users of the AI-powered incident action optimization and visualization system 1000. The curated data 1020 may clean and organize data through filtering, transformation, integration and labeling of data for supervised learning of the AI model 1074. Each resource in the AI-powered incident action optimization and visualization system 1000 may be labeled based on whether they are suitable for allocation. The normalized standardized data 1018 may be labeled based on the incident action model hub 1022 and input data prompt 1010 of the Wearable Action Artificial-Intelligence Model ("WAAIM" 102) database (e.g., using safety regulation and compliance database 1026), according to one embodiment.

The data lake and/or analytics hub 1024 may be a repository to store and manage all the data related to the AI-powered incident action optimization and visualization system 1000. The data lake and/or analytics hub 1024 may receive and integrate data from various sources in the network to enable data analysis and exploration for incident action optimization and visualization, according to one embodiment.

Maturity Level 1: Prompt, In-Context Learning, and Chaining: At this stage, a model can be selected and prompted to perform a task. The responses are assessed and the model can be re-prompted if necessary. In-context learning (ICL) allows the model to learn from a few examples without changing its weights. Prompt and In-Context Learning can involve prompting the AI with specific resource information and learning from past successful incident resources management to improve suggestions, according to one embodiment.

Input data prompt 1010 may be a process of engineering input prompts for AI-powered incident action optimization and visualization system 1000. Input data prompt 1010 may be the process of structuring text that can be interpreted and understood by a generative AI model. The engineering prompts 1042 may create clear and concise prompts that guide the model towards generating desired outputs. The engineering prompts 1042 may include relevant context and constraints in the prompts. The engineering prompts 1042 may help choose a model domain that may specify the domain of knowledge the model should utilize during generation and ensures that the model can be trained on data relevant to the target domain, according to one embodiment.

The engineering prompts 1042 may further include an example database that provides examples of desired output to guide the model. The engineering prompts 1042 may include specifically crafted prompts that effectively convey the desired task and/or questions that encourage a coherent, accurate, and relevant response from the AI model 1074, according to one embodiment.

A prompt may be natural language text describing the task that an AI model 1074 for an incident action and visualization system 1000 should perform. Prompt engineering may serve as the initial input to the curated data 1020. It may encapsulate the requirements, objectives, and constraints related to incident action within the military and police resource allocation management. Input data prompt 1010 may be formulated based on various factors such as land characteristics, zoning regulations, and other relevant parameters of the military and police incident. It may initiate the optimization and visualization process, guiding the AI system on the specific goals and considerations for incident actions. Before starting with data preparation, it's essential to define the problem the user wants the AI model 1074 to solve. During this stage, the user (e.g., battalion commander 106) may identify the specific tasks or instructions the model of the AI powered incident action optimization and visualization system 1000 should be capable of handling. This helps set the stage for designing appropriate prompts and planning for potential tuning strategies later on, according to one embodiment.

Select/generate/test prompt and iterate 1044 may be the process that involves the iterative process of selecting, generating, and testing prompts. AI-powered incident action optimization and visualization system 1000 may refine the prompt engineering through successive iterations, adjusting parameters and criteria to enhance the optimization results. This iterative loop may be essential for fine-tuning the AI algorithms, ensuring that the system adapts and improves its performance based on feedback and testing, according to one embodiment.

Choosing model/domain 1046 may be the process of selecting an appropriate AI model and/or domain for the incident action optimization task. Different models may be employed based on the complexity of the hostile situation, regulatory framework, and/or specific project requirements. The choice of model/domain influences the system's ability to analyze and generate optimized incident action solutions tailored to the given context, according to one embodiment.

The prompt user (e.g., battalion commander 106) comment and past analysis learning database 1048 may be a repository of user queries and/or inputs that are used for training and/or testing the AI model 1074 to elicit a specific response and/or output for the incident action optimization. The prompt user comment and past analysis learning database 1048 may be iteratively modified based on the user interaction and analysis of past learning models, according to one embodiment.

Chain it: This involves a sequence of tasks starting from data extraction, running predictive models, and then using the results to prompt a generative AI model 1074 to produce an output. Chain it can mean applying predictive analytics to military and police management data, according to one embodiment.

Tune it: Refers to fine-tuning the model to improve its responses. This includes parameter-efficient techniques and domain-specific tuning. Tune it can involve fine-tuning the AI with hostile incident occurrences and specific resource management constraints for accurate estimations, according to one embodiment.

Deploy, Monitor, Manage 1008: After a model can be validated, it can be deployed, and then its performance can be continuously monitored. Deployment can see the AI being integrated into the AI platform, where it can be monitored and managed as users interact with it for incident action suggestions. In this phase, a model can be validated before deployment. The validate model 1064 may be a set of processes and activities designed to ensure that an ML or an AI model 1074 performs a designated task, including its design objectives and utility for the end user. The validate model 1064 may perform final testing to ensure model readiness for deployment and address any remaining issues identified during testing. The validate model 1064 may evaluate the trained model's performance on unseen data. For example, the unseen data may include data from a new neighborhood that can be currently under threat, data from a demographic group that can be not well-represented in the training data, data from a hypothetical scenario, such as a proposed threat zoning change, environmental factors, reflecting diverse demographics, and geographical locations. This may be done by analyzing the trained model's performance on data from diverse geographical locations and ensuring it does not perpetuate historical biases in resource allocation provisions. Validate model 1064 may be evaluated for potential bias in security resource allocation and response decisions, promoting equitable development and avoiding discriminatory patterns, the fair and transparent valuations across different demographics and locations, ensuring it may be generalized well and produce accurate predictions in real-world scenarios. Validate model 1064 may help in identifying potential biases in the mode's training data and/or its decision-making process, promoting fairness and ethical AI development. By identifying areas where the train model may be improved, validate model 1064 may help to optimize its performance and efficiency, leading to better resource utilization and scalability. Once the final fine-tune model 1058 can be validated, it may be put to the test with data to assess its real-world effectiveness. Subsequently, it can be deployed for practical use within the AI-powered incident action optimization and visualization system 1000, according to one embodiment.

The deploy and serve model 1066 may include deploying the trained model after validating through the validate model 1064 to the endpoint, testing the endpoint, and monitoring its performance. Monitoring real-time data may identify changes in military and police incident occurrences, zoning regulations, and environmental conditions, and updating the AI model's fine-tuning accordingly. The models performance may be continuously monitored using the continuous monitoring model 1068, and additional fine-tuning may be performed as needed to adapt to evolving regulations and shifting market conditions by using the fine-tune model 1058. Continuous monitoring model 1068 may provide perpetual monitoring for optimum performance of the model. The prediction model 1070 may be a program that detects specific patterns using a collection of data sets. The prediction model 1070 may make predictions, recommendations and decisions using various AI and machine learning (ML) techniques of the AI-powered incident action optimization and visualization system 1000. Predictive modeling may be a mathematical process used to predict future events or outcomes by analyzing patterns in a given set of input data. A model registry 1076 may be a centralized repository for storing, managing, and tracking the different versions of the machine learning models of the AI-powered incident action optimization and visualization system 1000. The model registry 1076 may act as a single source of truth for all model artifacts, including model code and weights, metadata like training parameters, performance metrics, and author information versions and timestamps documentation and note. The prediction model 1070 may involve much more than just creating the model itself. encompassing validation, deployment, continuous monitoring, and maintaining the model registry 1076, according to one embodiment.

Maturity Level 3: RAG it & Ground it: Retrieval Augmented Generation (RAG) can be used to provide context for the model by retrieving relevant information from a knowledge base. Grounding ensures the mode's outputs are factually accurate. RAG and Grounding can be utilized to provide contextually relevant information from security regulation and compliance database 1026 to ensure recommendations are grounded in factual, up-to-date military and police incident data, according to one embodiment.

FLARE it: A proactive variation of RAG that anticipates future content and retrieves relevant information accordingly. FLARE it can predict future changes in safety zoning laws or environmental conditions that can affect military and police resource allocation potential, according to one embodiment.

CoT it or ToT it. GoT it?: These are frameworks for guiding the reasoning process of language models, either through a Chain of Thought, Tree of Thought, or Graph of Thought, allowing for non-linear and interconnected reasoning. CoT, ToT, GoT frameworks can guide the AI's reasoning process as it considers complex hostile scenarios, ensuring it can explore multiple outcomes and provide well-reasoned military and police resource allocation suggestions, according to one embodiment.

Figure 11:
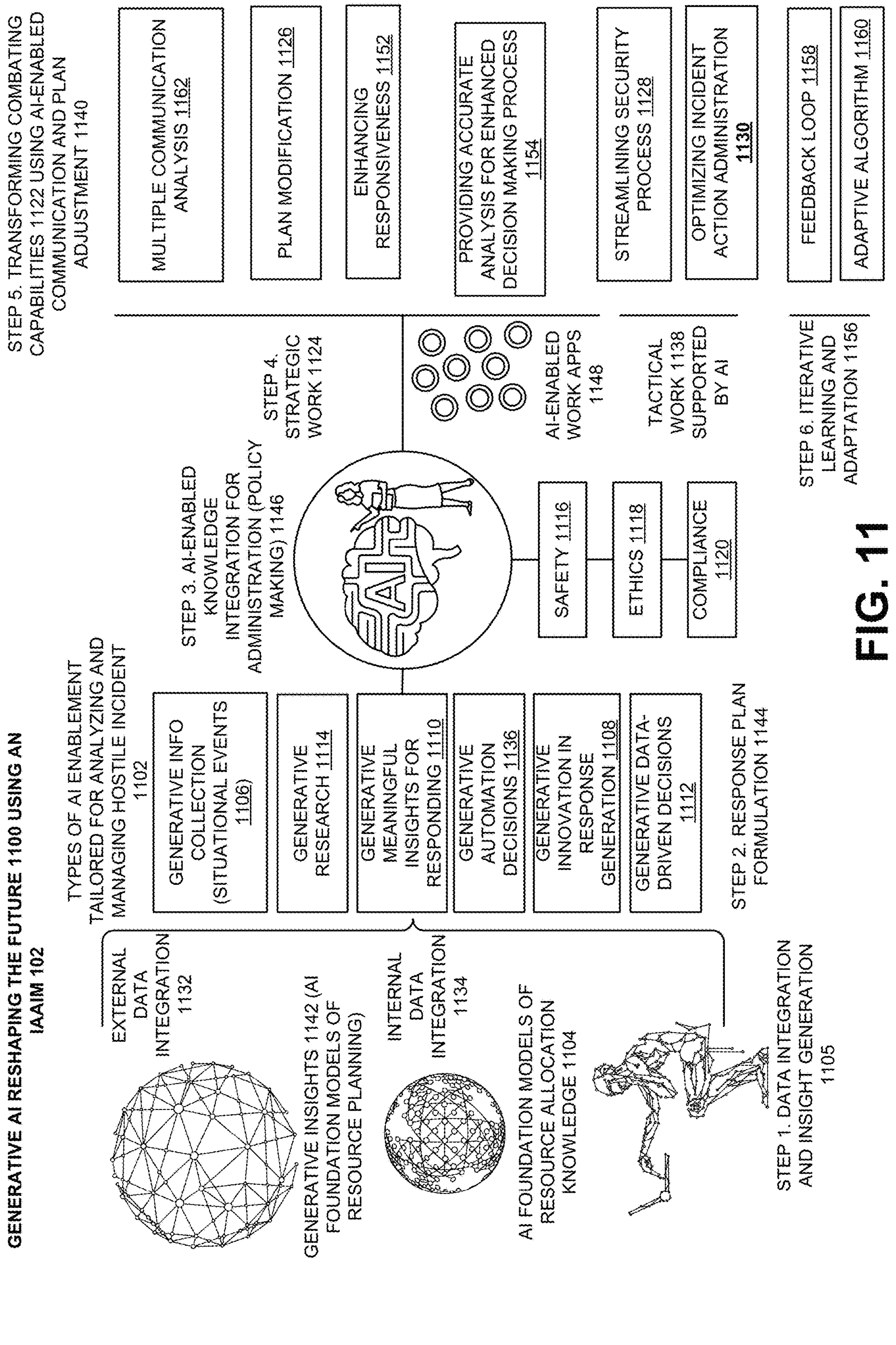
FIG. 11 illustrates the concept of "Generative AI Reshaping the Future," to transform various aspects of generative AI of the edge based ad-hoc network for automatically generating an incident action plan through the WAAIM, according to one embodiment.

FIG. 11 illustrates the concept of "Generative AI Reshaping the Future 1100," to transform various aspects of generative AI of the edge based ad-hoc network for automatically generating an incident action plan 200 through the WAAIM 102, according to one embodiment. FIG. 11 showcases how artificial intelligence, particularly generative AI, can transform various aspects of incident action planning for military and police, according to one embodiment.

A generative AI model 1074 for automatically generating and modifying an incident action plan 200 in response to a hostile incidents 1102—Wearable Action Artificial-Intelligence Model (WAAIM 102)—can follow a multi-step process as described below:

Step 1. Data Integration and Insight Generation 1105:

External Data Integration 1132: WAAIM 102 can collect data from external sources such as security reports, threat conditions, and satellite imagery to understand the broader context of the hostile incident. This may further include generative info collection of situational events 1106 and types of AI enablement that are tailored for analyzing and managing hostile incidents 1102.

Internal Data Integration 1134: It can also integrate internal data such as the current location of resources, personnel availability, and equipment status within the emergency services.

Generative Insights 1142: Using generative AI algorithms, WAAIM 102 can analyze both sets of data to generate insights into the current hostile situation, potential threat, and the effectiveness of various response strategies.

Step 2. Response Plan Formulation 1144:

Generative Research 1114: WAAIM 102 can research historical data and similar past incidents to inform the initial incident action plan.

Generative Innovation in Response Generation 1108: It can simulate innovative response scenarios to predict outcomes using advanced AI techniques like GANs (Generative Adversarial Networks).

Generative Automation Decisions 1136: AI can automate the decision-making process for initial incident action based on the above insights and simulations.

Generative Meaningful Insights for Responding 1110: It may refer to valuable and actionable information created using generative AI technologies to enhance understanding, decision-making, and strategic planning during operational emergencies.

Step 3. AI-Enabled Knowledge Integration for Administration (Policy Making) 1146—Safety, Ethics, and Compliance:

Safety 1116: Prioritize the safety of civilians and responders in the incident action plan.

Ethics 1118: Ensure the plan adheres to ethical guidelines, such as equitable resource distribution.

Compliance 1120: Follow legal and regulatory requirements applicable to emergency response.

Step 4. Strategic and Tactical Work:

Strategic Work 1124: Include strategic considerations such as potential escalation, the need for additional resources, and long-term impacts of the hostile incident.

Tactical Work 1138: Develop a tactical plan detailing specific assignments for each unit and responder, and real-time adjustments as the situation evolves. This step may enable streamlining the security process 1128 and may involve optimizing the incident action administration 1130, according to one embodiment.

Step 5. Transforming Combating Capabilities 1122 Using AI-Enabled Communication and Plan Adjustment 1140:

Multiple Communication Analysis 1162: Implement NLP (Natural Language Processing) to analyze trusted radio communications from battalion commanders and responders.

Plan Modification 1126: Use insights from real-time data and communications to modify the incident action dynamically. This may include enhancing responsiveness 1152 and providing accurate analysis for enhanced decision making process 1154, according to one embodiment.

AI-Enabled Work Apps 1148: Develop applications that assist battalion commanders $\mathbf{106}_{1\text{-}N}$ in visualizing and managing incident actions effectively, according to one embodiment.

Step 6. Iterative Learning and Adaptation 1056:

Feedback Loops 1158: Create feedback mechanisms to learn from the effectiveness of incident actions and update the AI model 1074 for continuous improvement, according to one embodiment.

Adaptive Algorithms 1160: Use machine learning to adapt the allocation strategies based on outcomes and effectiveness in real-time, according to one embodiment.

FIG. 11 demonstrates the transformative impact of AI on governance, particularly through the analysis of ambient signals, according to one embodiment. Strategically, the AI identifies emerging issues and trends in ambient signals, informing policy-makers about the pressing concerns of their constituents. This insight can be crucial in addressing societal challenges related to safety resource allocation planning and management. It also enhances the decision-making process by providing accurate analyses or analysis of ambient data, according to one embodiment. This integration of AI in public administration represents a significant advancement in enhancing democratic engagement, making the public consultation process more accessible and impactful, according to one embodiment.

Figure 12:
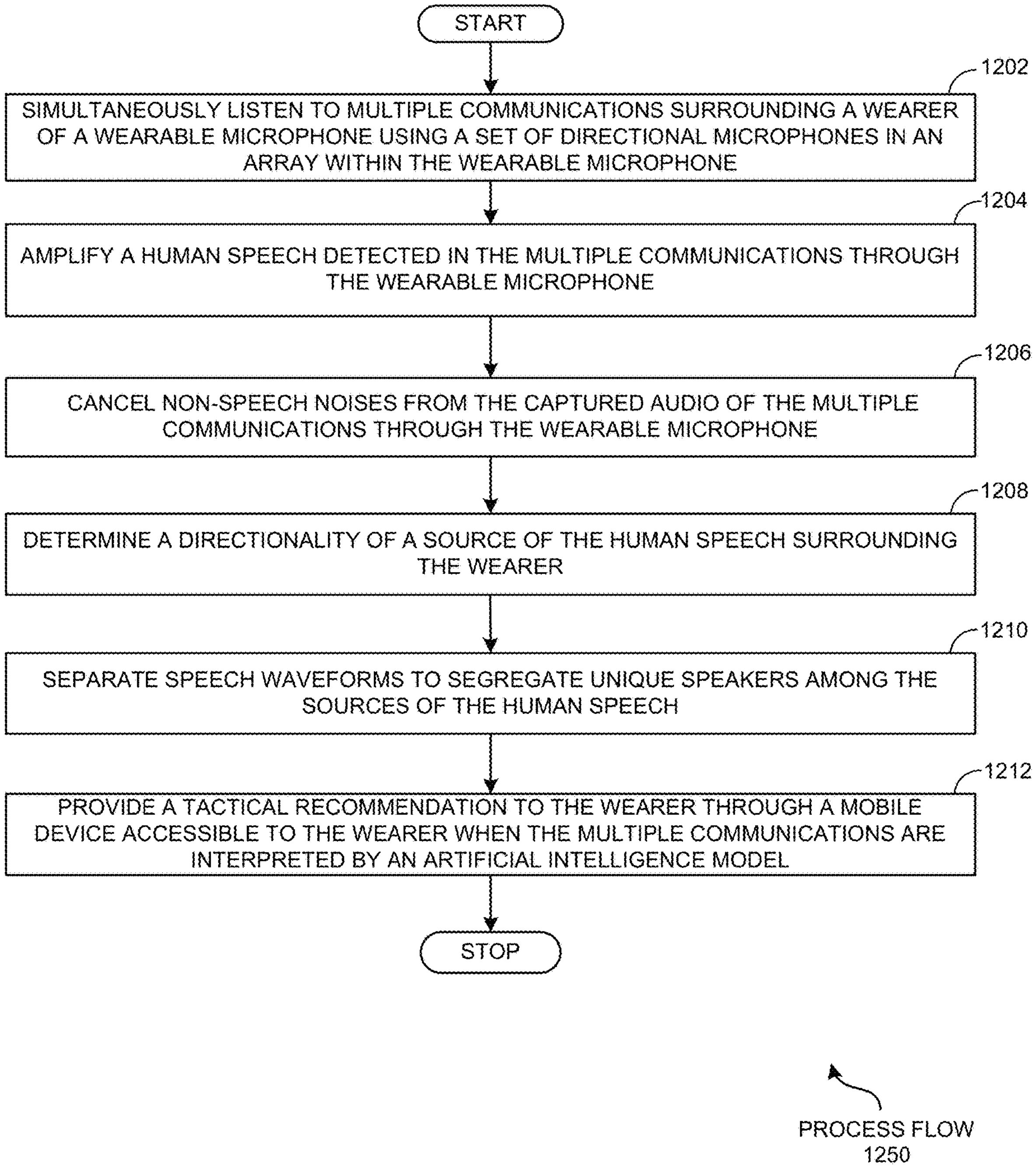
FIG. 12 is a process flow diagram detailing the operations involved in generating a tactical recommendation using the WAAIM, according to one embodiment.

FIG. 12 is a process flow diagram 1250 detailing the operations involved in generating an incident action plan 200 using the WAAIM 102, according to one embodiment. In operation 1202, a set of directional microphones in an array within a wearable microphone 100 simultaneously listens to multiple communications surrounding a wearer 116. In operation 1204, the Wearer Assistant Artificial-Intelligence Model ("WAAIM") 102 of the wearable microphone 100 amplifies a human speech detected in the multiple communications 104 through the wearable microphone 100. In operation 1206, Wearer Assistant Artificial-Intelligence Model ("WAAIM") 102 of the wearable microphone 100 cancels non-speech noises from the captured audio of the multiple communications through the wearable microphone 100.

Then, in operation 1208, the Wearer Assistant Artificial-Intelligence Model ("WAAIM") 102 of the wearable microphone 100 determines a directionality of a source of the human speech surrounding the wearer 116. Next, in operation 1210, the Wearer Assistant Artificial-Intelligence Model ("WAAIM") 102 of the wearable microphone 100 separates speech waveforms to segregate unique speakers among the sources of the human speech.

In operation 1212, the Wearer Assistant Artificial-Intelligence Model ("WAAIM") 102 of the wearable microphone 100 provides a tactical recommendation 107 to the wearer 116 through a mobile device 144 accessible to the wearer 116 when the multiple communications 104 are interpreted by an artificial intelligence model 140.

Figure 13:
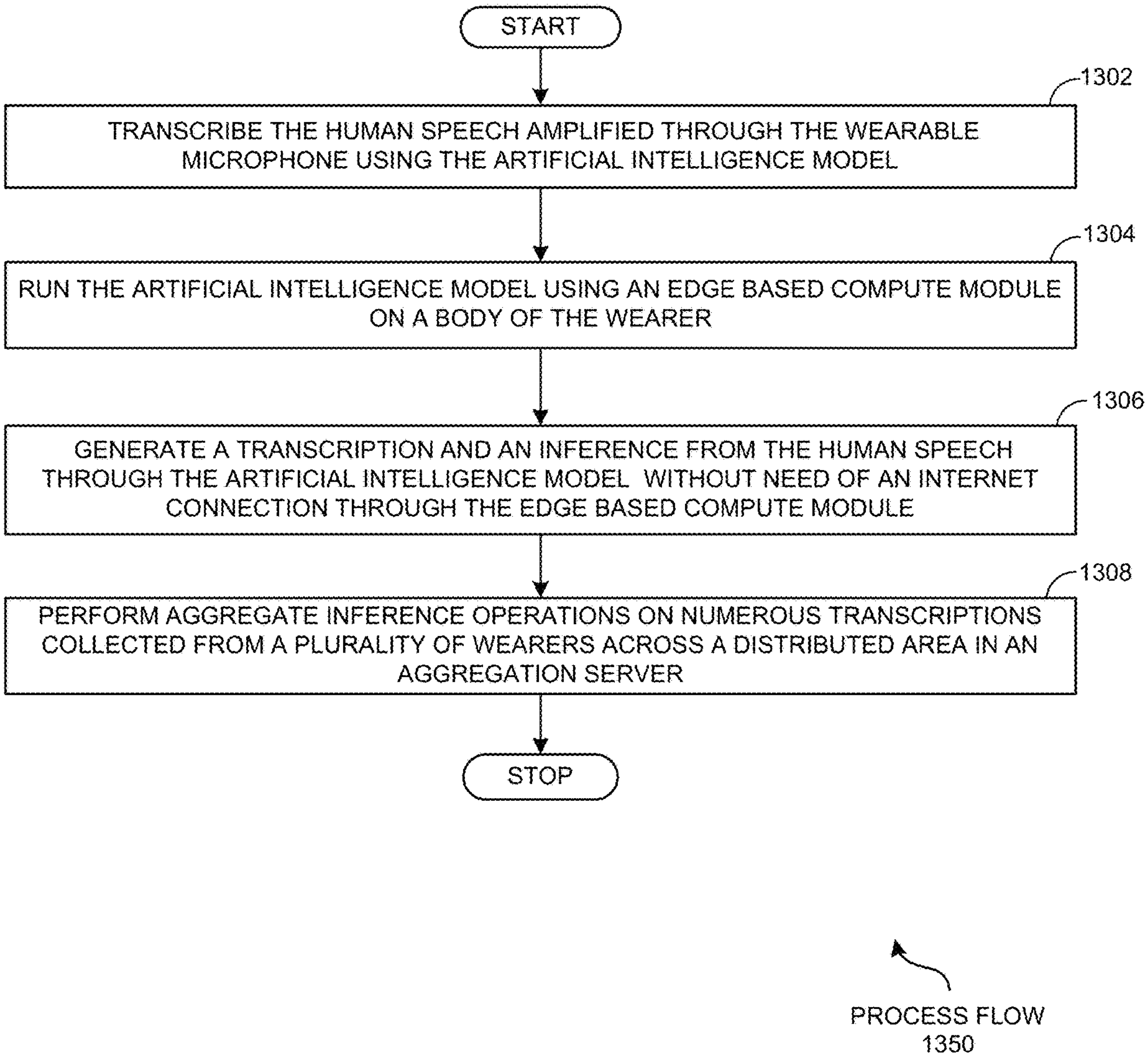
FIG. 13 is another process flow diagram detailing the operations involved in performing an aggregate inference operation on transcriptions collected from a plurality of wearers of the wearable microphone in an aggregation server using the WAAIM, according to one embodiment.

FIG. 13 is another process flow 1350 diagram detailing the operations involved in performing an aggregate inference operations on transcriptions 125 collected from a plurality of wearers 116 of the wearable microphone 100 in an aggregation server 145 using the WAAIM 102, according to one embodiment. In operation 1302, an artificial intelligence model 140 transcribes the human speech amplified through the wearable microphone 100 using a Wearable Action Artificial-Intelligence Model ("WAAIM") 102. In operation 1304, an edge based compute module 142 on a body of the wearer 116 runs the artificial intelligence model 140. In operation 1306, a transcription 125 and an inference 127 from the human speech through the artificial intelligence model 140 is generated without need of an internet connection through the edge based compute module 142. In operation 1308, an aggregation server 145 performs aggregate inference operations on numerous transcriptions 125 collected from a plurality of wearers 116 across a distributed area, according to one embodiment.

Figure 14:
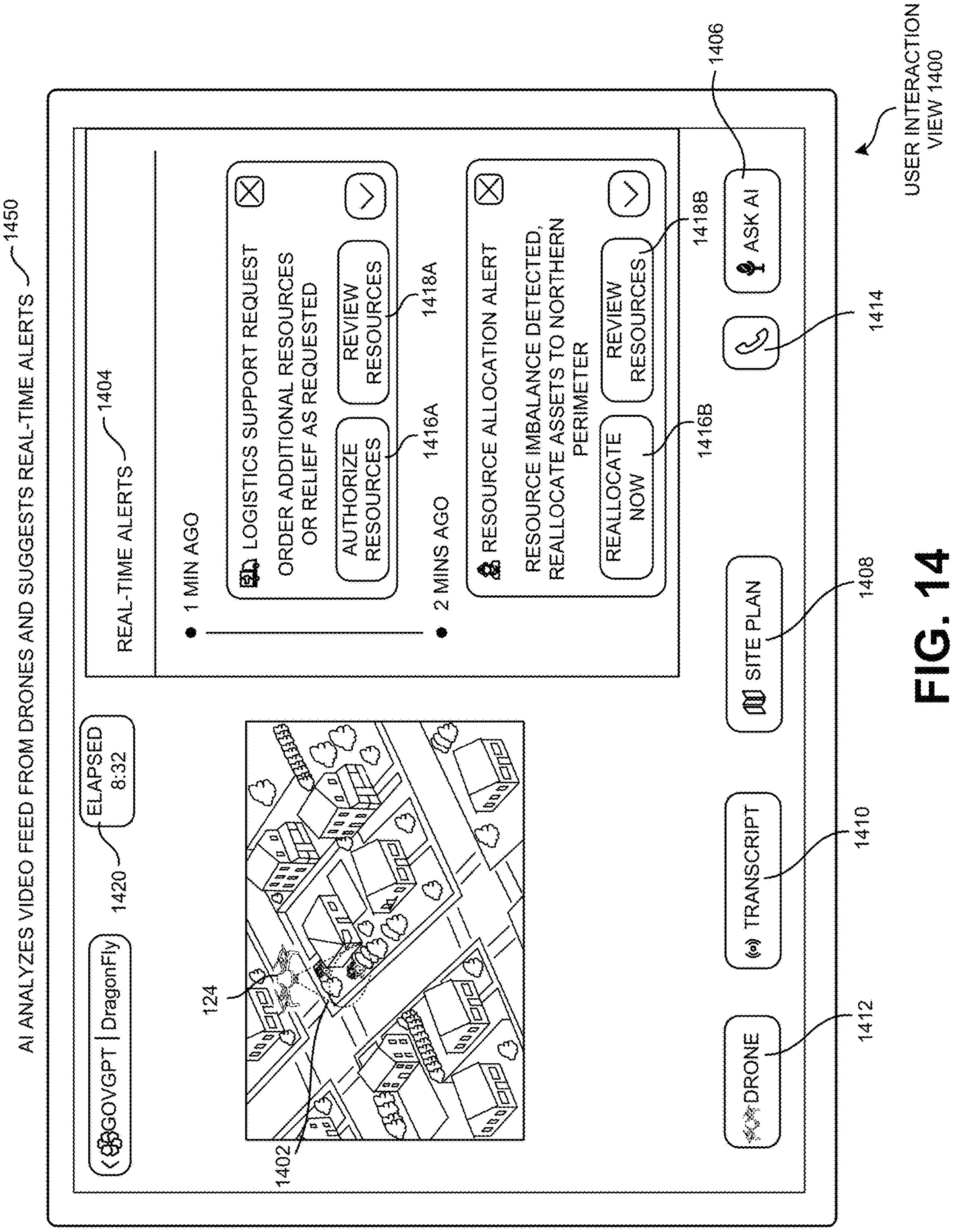
FIG. 14 is a user interaction view showing drone footage alongside real time alerts, according to one embodiment.

FIG. 14 is a user interaction view 1400 showing drone footage 1412 alongside real time alerts 1404, according to one embodiment. In FIG. 14, a drone view 1402 is illustrated on the left side of the page, showing an active hostile incident 414 through aerial footage, according to one embodiment. Real time alerts 1404 are shown on the left side, which provide time based (e.g., 1 min ago) automated AI generated alerts that are communicated to the battalion commander 106 through the wearable headphone 100, according to one embodiment. Automatically are displayed action buttons such as "Authorize Resources" 1416A or "Reallocate Now" 1416B based on the situational needs, according to one embodiment. These buttons may be tied to specific instructions that can be executed by the AI, according to one embodiment. The buttons "Review Resources" 1418A and 1418B might allow the battalion commander 106 to review available resources based on intervals before and after the resource request is made, according to one embodiment. The Ask AI 1406 may be a button in which an interactive voice response question can be posed to the display 202 directly to query the AI, according to one embodiment.

Figure 15:
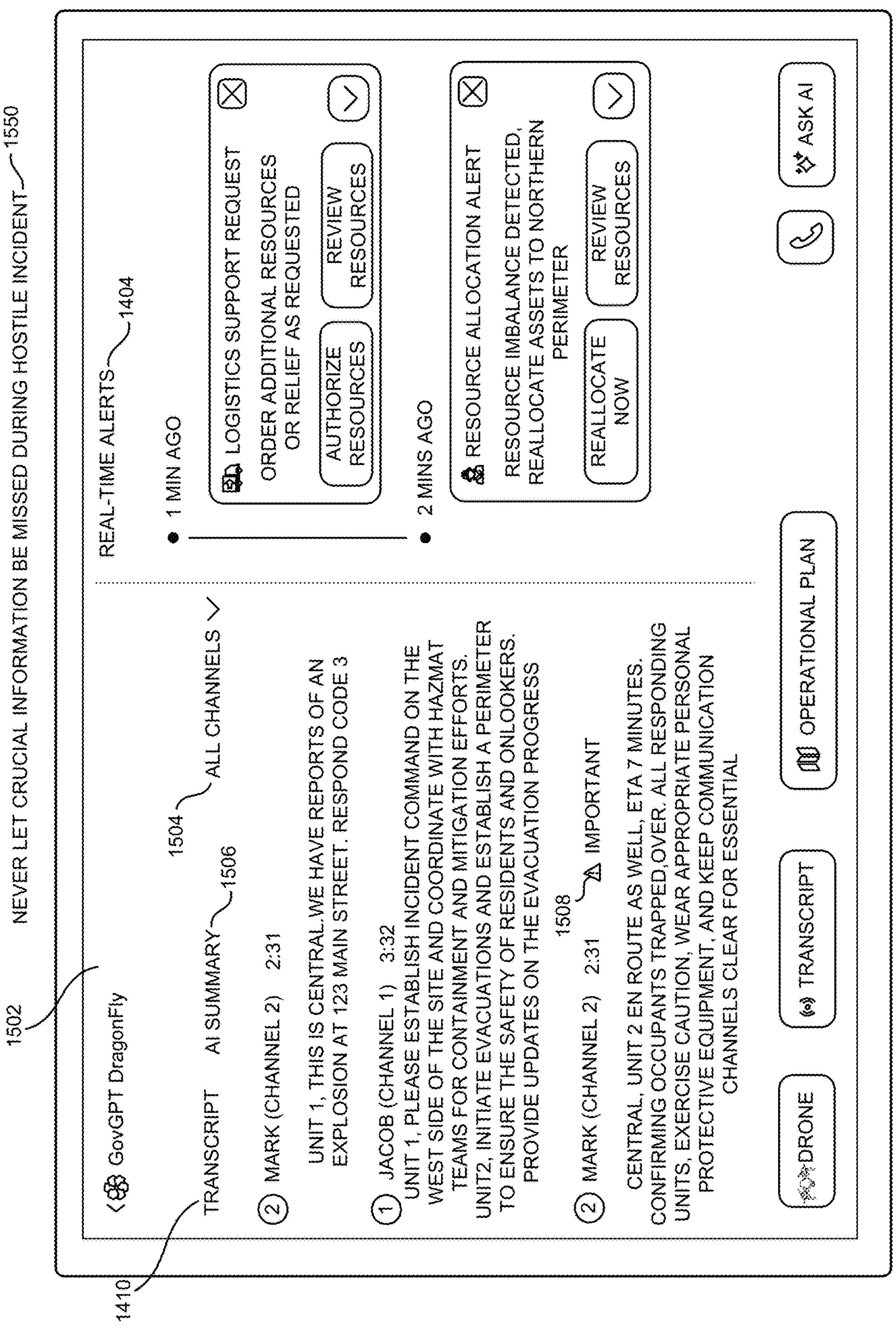
FIG. 15 is a user interaction view showing a transcript view along with highlighted alerts, according to one embodiment.
Figure 16:
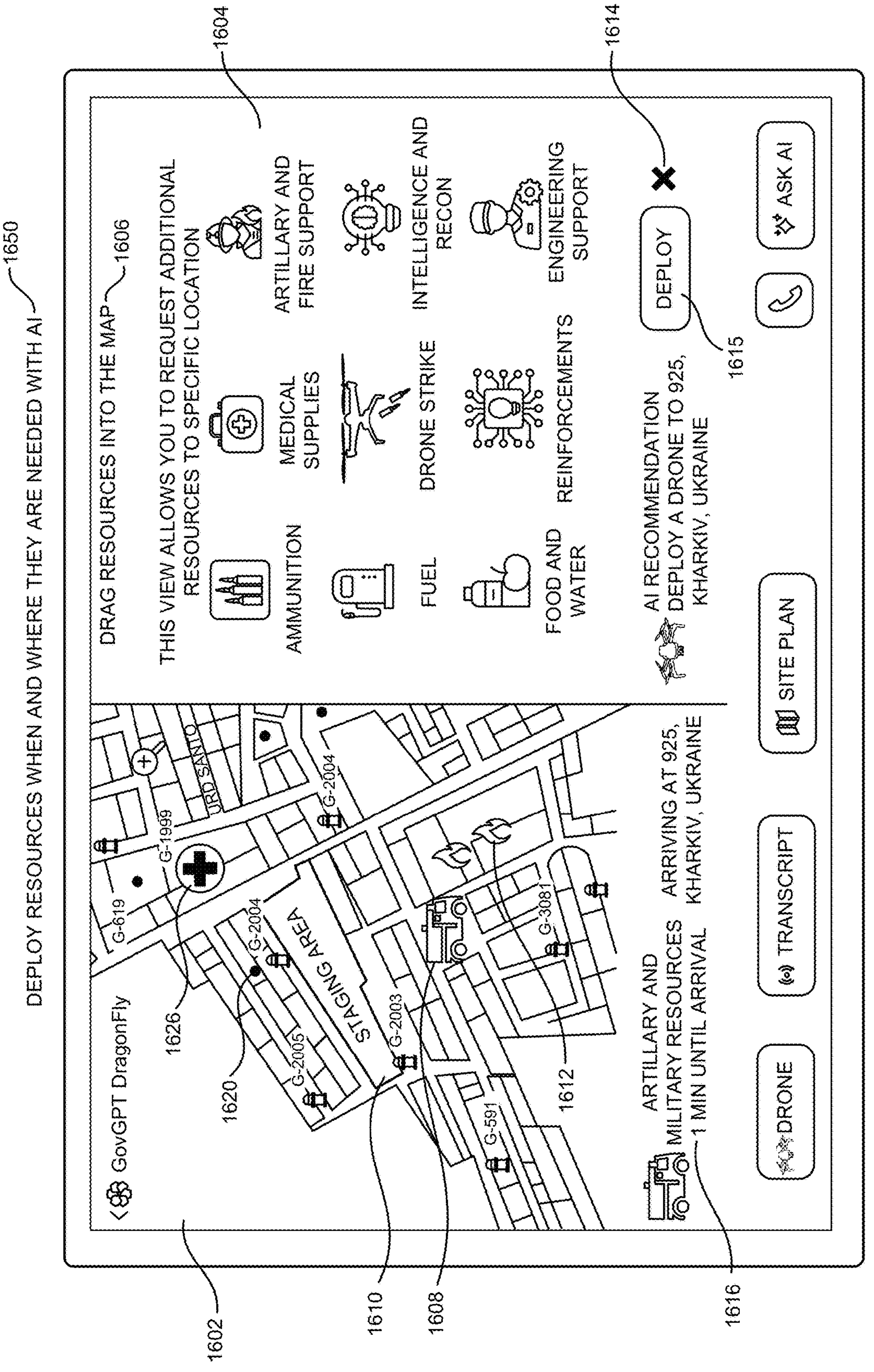
FIG. 16 is a user interaction view showing a drag and drop view along with alerts, according to one embodiment.

There are three tabs shown in the view of FIG. 14, according to one embodiment. The first tab, "Site Plan" 1408 allows the user to view a operational plan as shown in FIG. 16, according to one embodiment. The button "Transcript 1410" shows the transcript, as shown in FIG. 15, according to one embodiment. The drone view 1412 shows the view in FIG. 14, in which AI analyzes video feed 121 from drones (e.g., UAV 124) and suggests real-time alerts 1450, according to one embodiment. The phone button 1414 allows the user to quickly click to call preset or manual dialed phone numbers, according to one embodiment. The elapsed time 1420 shows how much time has elapsed into an active incident in real time, according to one embodiment.

FIG. 14 is presented as a comprehensive user interaction interface, designed to enhance situational awareness and decision-making during emergency incidents by integrating drone footage with real-time, AI-generated alerts, according to one embodiment. The interface is divided into two primary sections. On the left side, viewers are presented with a dynamic drone view 1402, offering aerial footage of an active emergency scenario, specifically showcasing a building engulfed in flames, according to one embodiment. This live feed provides battalion commanders with a bird's-eye perspective of the situation, allowing for a broader understanding of the incident's scope and the effectiveness of the response efforts, according to one embodiment.

Adjacent to the drone view, on the right side of the interface, is the real-time alerts section 1404. This area is dedicated to delivering automated, AI-generated alerts that are time-stamped (e.g., "1 min ago") to provide immediate insights into the evolving situation. These alerts are communicated directly to the battalion commander 106 via a wearable headphone 100, ensuring that critical information is readily accessible and actionable. The AI's role extends to analyzing the drone footage in real-time, identifying significant developments, and generating relevant alerts 1450 to aid in swift decision-making, according to one embodiment.

Central to the interface are action buttons, such as "Authorize Resources" 1416A and "Reallocate Now" 1416B, which are automatically displayed based on the assessed needs of the ongoing incident, according to one embodiment. These buttons are directly linked to predefined commands that the AI can execute, streamlining the response process, according to one embodiment. Additionally, a "Review Resources" 1418B button offers the battalion commander 106 the capability to assess the resources currently available for deployment, ensuring an efficient allocation of assets, according to one embodiment.

Another innovative feature is the "Ask AI" button 1406, enabling direct interaction with the system through voice queries, according to one embodiment. This function allows the battalion commander 106 to request specific information or guidance from the AI, which is then displayed on the interface, facilitating a more interactive and responsive user experience, according to one embodiment.

The interface also includes three informative tabs: "Site Plan" 1408, "Transcript" 1410, and the drone view 1412 itself, according to one embodiment. The "Site Plan" 1408 tab provides access to detailed layouts of the incident site, offering strategic insights that are crucial for planning and operations, according to one embodiment. The "Transcript" 1410 tab displays a detailed record of communications and alerts, ensuring that all information is documented and accessible for review, according to one embodiment. The drone view 1412 tab reaffirms the interface's focus on providing a real-time visual assessment of the situation, according to one embodiment.

Additionally, a phone button 1414 is integrated into the interface, enabling users to quickly initiate calls to pre-set or manually dialed numbers, enhancing communication efficiency during critical moments, according to one embodiment. The elapsed time indicator 1420 is another key feature, offering real-time updates on the duration of the incident, assisting in the management of resources and the evaluation of response efforts over time, according to one embodiment.

Overall, FIG. 14 depicts an advanced, user-centric interface designed to optimize emergency response operations through the seamless integration of live aerial visuals, AI-driven analytics, and interactive functionalities, according to one embodiment. This embodiment aims to empower battalion commanders with immediate access to critical information, enabling informed decision-making and effective incident management, according to one embodiment.

FIG. 15 is a user interaction view 1502 showing a transcript 1410 along with highlighted alerts, according to one embodiment. FIG. 15 shows a view that allows a goal of never letting crucial information be missed during a hostile incident 1550, according to one embodiment. A transcript 1410 is shown on the left side (e.g., similar to Otter.ai) but with important alerts highlighted, according to one embodiment. The user can also indicate which radio channels to show transcripts for in selector 1504, or see an AI summary of the transcript using button 1506, according to one embodiment.

FIG. 15 introduces a sophisticated user interaction view that emphasizes the importance of comprehensive communication and information management during emergency scenarios, specifically focusing on hostile incidents 1550, according to one embodiment. This view is meticulously designed to ensure that crucial information is consistently highlighted and accessible, preventing any oversight in the heat of the moment.

At the core of FIG. 15 is the transcript view 1410, strategically placed on the left side of the interface, according to one embodiment. This component bears resemblance to the functionality offered by advanced transcription services like Otter.ai, but it is further enhanced for emergency management purposes, according to one embodiment. The transcript 1410 captures live audio feeds from various sources and converts them into text in real-time, offering a detailed, written record of all communications, according to one embodiment. What sets this transcript apart is its intelligent feature of highlighting important alerts within the text, according to one embodiment. This design choice ensures that critical updates, warnings, and instructions stand out, enabling quick identification and action by the user, according to one embodiment.

To cater to the complex nature of emergency response operations, the interface includes a channel selector 1504, according to one embodiment. This selector allows users to tailor the transcript view 1410 to their specific needs by choosing which channels or communication feeds to display, according to one embodiment. This flexibility ensures that the user can focus on the most relevant information streams, significantly improving situational awareness and the efficiency of information processing, according to one embodiment.

An additional layer of intelligence is introduced with an AI summary button 1506, according to one embodiment. This feature provides users with the option to condense the extensive transcript into a concise summary, generated through AI analysis, according to one embodiment. The summary aims to distill the essence of the communications, highlighting pivotal information and insights through a flashing 1508 button that could influence decision-making processes, according to one embodiment. This tool is invaluable for users who need to grasp the situation quickly or review key points from lengthy discussions without sifting through the entire transcript, according to one embodiment.

FIG. 15 is designed with a clear goal: to make sure that during the chaos of a hostile incident, no vital information goes unnoticed, according to one embodiment. It achieves this by combining real-time transcription with intelligent highlighting of alerts through the flashing 1508 button, customizable channel selection for tailored information flow, and AI-powered summarization for quick comprehension, according to one embodiment. This embodiment stands as a testament to the potential of integrating advanced technology with emergency management practices, offering a user-centric solution that enhances communication, streamlines information processing, and ultimately supports more effective incident response strategies, according to one embodiment.

FIG. 16 is a user interaction view showing a drag and drop view 1650 along with alerts, according to one embodiment. A map view 1602 is shown on the left, showing an active hostile explosion incident 1612 and a military vehicle 1608, according to one embodiment. Numerous ingress/egress routes can be shown on the map, according to one embodiment. A staging area 1610 is also shown on the map, and which can automatically be relocated based on an AI recommendation, according to one embodiment. This view allows the battalion commander 106 an Uber/Lyft like interface to drag and drop into the map 1606 resources 1604 like military vehicles, ambulances, Hazmat teams, ladder trucks, engineering support, drones, police vehicles, and additional squad soldiers from the right side of the user interface onto the map, and automatically schedule vehicles and resources to a specific location, according to one embodiment. A time of arrival is automatically shown with indicator 1616, according to one embodiment. Also, AI recommendations of resources are displayed in 1614 along with an action button to "Deploy" resources 1615, according to one embodiment.

FIG. 16 presents an advanced user interaction view that combines the immediacy and flexibility of drag-and-drop functionality with critical situational awareness tools, tailored for managing emergency incidents such as fires, according to one embodiment. This interface is designed to offer an intuitive, highly interactive experience, akin to popular ride-sharing services like Uber or Lyft, but with functionalities specifically adapted for emergency response coordination, according to one embodiment.

Central to this view is the map display 1602 on the left side of the interface, which serves as the operational canvas for the battalion commander 106, according to one embodiment. The map vividly illustrates key elements of the current scenario, including the location of an active hostile explosion incident 1612, the positions of military vehicles 1608, and the proximity of critical infrastructure such as hospitals 1626, according to one embodiment. Additionally, it provides a comprehensive overlay of essential resources and logistical information, such as the locations of numerous strategic points 1620 and designated ingress/egress routes, enhancing the commander's ability to strategize responses effectively, according to one embodiment.

A notable feature of the map is the inclusion of a staging area 1610, which is dynamically adjustable based on AI-generated recommendations, according to one embodiment. This functionality allows for the optimal positioning of response units and resources, ensuring they are strategically placed for rapid deployment and efficiency, according to one embodiment.

The right side of the user interface hosts a palette of resources 1604 that can be deployed in response to the incident, according to one embodiment. This selection includes, but is not limited to, military vehicles, ambulances, Hazmat teams, ladder trucks, military vehicles, drones, police vehicles, and additional squad soldiers, according to one embodiment. The battalion commander can effortlessly assign these resources to specific locations on the map through a drag-and-drop action 1606, simulating the deployment of units in real time, according to one embodiment. This method not only simplifies the allocation process but also allows for a visual and interactive planning experience, according to one embodiment.

Once resources are allocated, the system automatically calculates and displays the estimated time of arrival 1616 for each unit, providing the commander with critical timing insights to coordinate the response efforts more effectively, according to one embodiment. This feature ensures that the battalion commander can make informed decisions regarding the timing and placement of resources to address the evolving situation, according to one embodiment.

Moreover, AI-generated recommendations for resource deployment 1614 are displayed within the interface, accompanied by a "Deploy" action button 1615, according to one embodiment. These recommendations are based on a sophisticated analysis of the current scenario, available assets, and logistical considerations, offering suggestions to optimize the response effort, according to one embodiment. By integrating these AI capabilities, the interface not only facilitates manual resource management but also enhances decision-making with data-driven insights, according to one embodiment.

In essence, FIG. 16 encapsulates a forward-thinking approach to emergency incident management, merging intuitive design with intelligent functionalities, according to one embodiment. It empowers battalion commanders with a comprehensive toolset for real-time resource allocation, strategic planning, and situational analysis, all aimed at improving the efficacy and efficiency of emergency responses, according to one embodiment.

Implementing an WAAIM 102 to process information efficiently without overloading a generative AI wearable headphone 100 like the one used by a battalion commander 106 requires careful consideration of network topologies. The aim can be to ensure that the device remains lightweight, has a long battery life, and can be capable of rapid communication. Here are different network topologies that can be employed, according to one embodiment:

Edge Computing: Processes data of the WAAIM 102 at the edge of the network, close to where it's generated, rather than in a centralized data-processing warehouse. The generative AI wearable headphone 100 can preprocess voice commands locally for immediate responsiveness and then send specific queries to a more powerful edge device (like a mobile command center or a vehicle-mounted computer) for complex processing. The advantage includes reduced latency, conserved bandwidth, and opportunity the wearable headphone 100 can operate with minimal processing power, extending battery life.

Cloud Computing: Utilizes cloud services for data processing and storage. The generative AI wearable headphone 100 sends data to the cloud, where heavy-duty computing resources process the information and send back responses. This approach leverages the virtually unlimited resources of the cloud for complex analysis and AI processing. Advantages: Offloads processing from the generative AI wearable headphone 100, allows for more complex AI models than the device can run locally, and keeps the device small and energy-efficient.

Fog Computing. A decentralized computing infrastructure in which data, compute, storage, and applications are located somewhere between the data source and the cloud. This can mean leveraging nearby devices or local servers for processing before moving data to the cloud if necessary. Offers lower latency than cloud computing by processing data closer to the source, reduces bandwidth needs, and supports real-time decision making without overloading the wearable device.

Hybrid Model. Combines edge, fog, and cloud computing, where the system intelligently decides where to process each piece of data or command based on criteria like processing power needed, bandwidth availability, and battery life conservation. Balances between latency, power consumption, and processing capabilities. It ensures that the wearable headphone 100 can function efficiently in a variety of scenarios, from low-connectivity environments to situations requiring heavy data analysis.

Mesh Network. A network topology where each node relays data for the network. Devices can communicate directly with each other and with local nodes (like operational trucks or command centers) that handle more significant processing tasks or act as bridges to other networks (like the internet or a dedicated emergency services network). Enhances reliability and redundancy. If one node fails, data can take another path, ensuring the system remains operational even in challenging conditions.

The optimal choice depends on various factors, including the specific requirements of the incident command operations, the environment in which the device will be used, and the availability of local vs. cloud computing resources. A hybrid model often provides the best flexibility, leveraging the strengths of each approach to meet the demands of different scenarios efficiently.

To ensure the GovGPT FireFly™ can be effective across various military operational scenarios, operational and product adjustments are necessary to cater to the unique challenges and requirements of each environment. GovGPT FireFly™, with its advanced AI capabilities, can offer dynamic and creative recommendations to modify real-time incident management plans. These recommendations are based on the integration of known operational plans and the continuous stream of radio communications received by the battalion commander. Here are some creative examples of how FireFly™ can enhance incident response strategies:

Urban Combat Scenario

- Situation: An enemy force has been reported occupying multiple buildings in a dense urban area.
- Radio Communication: "We have enemy forces occupying buildings on the north side, blocks 10 through 12, with potential spread to adjacent structures."
- FireFly™ Recommendation: "Based on the city's operational plan, recommend deploying sniper units to the rooftops for overwatch. Use UAVs for real-time surveillance of enemy movements. Direct assault teams to use underground tunnels to approach undetected and coordinate with armored units for a pincer movement."

Industrial Complex with Hazardous Materials

- Situation: Enemy forces have attacked an industrial complex, causing potential chemical leaks.
- Radio Communication: "Chemical spill reported in sector 4, visible smoke, need hazmat assessment."
- FireFly™ Recommendation: "The site plan indicates sector 4 houses volatile chemicals. Initiate immediate evacuation of downwind areas based on current wind direction. Deploy drone reconnaissance to assess the spread without risking personnel. Recommend hazmat units stage at the east entry, upwind from the incident, for containment and neutralization."

Mountainous Terrain Engagement

- Situation: Enemy forces are using high ground in a mountainous region to launch attacks.
- Radio Communication: "The enemy is fortified on the ridge at grid 456789, using the terrain to their advantage."
- FireFly™ Recommendation: "Utilize the topographical map to identify alternate routes for flanking. Deploy snipers to higher elevations for counter-offensive positions. Recommend artillery targeting to neutralize enemy fortifications and use UAVs to monitor enemy reinforcements."

Logistical Resupply in Hostile Territory

- Situation: A battalion requires urgent resupply in an area with high enemy activity.
- Radio Communication: "Requesting immediate resupply of ammunition and medical supplies at grid 789012."
- FireFly™ Recommendation: "Identify and use secure supply routes based on recent intel reports, Recommend deploying armed escorts for the supply convoy and using UAV surveillance to monitor potential threats. Schedule staggered supply drops to minimize risk exposure."

Evacuation in Dense Urban Area

- Situation: A high-density urban area needs evacuation due to an imminent enemy attack.
- Radio Communication: "Evacuation routes are congested. We're seeing bottlenecks at main exits."
- FireFly™ Recommendation: "The city's evacuation plan includes multiple alternate exits not currently in use. Broadcast announcements over the public address system to direct civilians to these exits. Coordinate with local police to manage traffic flow and prevent panic. Deploy rapid response teams to assist with evacuation efforts."

Defense of a Key Strategic Location

- Situation: The enemy is advancing towards a key strategic location that must be defended at all costs.
- Radio Communication: "Enemy forces advancing towards our command center at grid 345678."
- FireFly™ Recommendation: "Reinforce perimeter defenses and deploy anti-tank units at key choke points. Use electronic warfare to disrupt enemy communications. Coordinate with air support for precision strikes on advancing enemy formations."

Tailored Use Cases for a City in a War Zone in Gaza

Tailoring the GovGPT FireFly™ system for use in a city within a war zone in Gaza demands a focused approach that considers the specific characteristics and needs of the community. Here are adapted recommendations for emergency scenarios within this area:

Urban Combat Scenario in Gaza City

- Radio Communication: "Report of enemy forces occupying residential buildings on Salah al-Din Street, with potential spread to adjacent structures."
- FireFly™ Recommendation: "Cross-reference the address with the city's operational plans to identify key strategic points and access routes for friendly forces. Advise deploying sniper units to rooftops for overwatch and using UAVs for real-time surveillance. Direct ground assault teams to use underground tunnels for covert movement and coordinate with armored units for a combined assault."

Humanitarian Crisis in Refugee Camps

- Radio Communication: "Rising tensions and lack of supplies in the Jabalia refugee camp, potential for civil unrest."
- FireFly™ Recommendation: "Access camp layout and population data to prioritize distribution points for essential supplies. Coordinate with NGOs to ensure safe delivery of food, water, and medical aid. Deploy peacekeeping units to maintain order and protect humanitarian workers."

Chemical Attack Response

Radio Communication: "Suspected chemical attack in Shujaiya neighborhood, visible casualties and widespread panic."

FireFly™ Recommendation: "Identify wind direction and spread pattern using current weather data. Initiate immediate evacuation of downwind areas and deploy hazmat units with protective gear. Use drone reconnaissance to assess the extent of contamination and direct medical units to set up decontamination zones."

Civilian Evacuation Under Threat

Radio Communication: "Heavy shelling reported in the eastern district, civilians trapped and requesting evacuation."

FireFly™ Recommendation: "Leverage city maps to identify safe evacuation routes. Deploy armored vehicles to provide cover for civilians and coordinate with medical units for immediate care. Use public address systems and social media to inform civilians of evacuation points and procedures."

Infrastructure Sabotage and Repair

Radio Communication: "Sabotage reported on the main water supply line, severe shortages expected in central Gaza."

FireFly™ Recommendation: "Use city infrastructure plans to locate the damage and prioritize repair efforts. Deploy engineering units with security escorts to fix the water supply line. Coordinate with local authorities to ensure water distribution from alternate sources until repairs are complete."

Tailored Use Cases for a City in a War Zone in Ukraine

Tailoring the GovGPT FireFly™ system for use in a city within a war zone in Ukraine demands a focused approach that considers the specific characteristics and needs of the community. Here are adapted recommendations for emergency scenarios within this area:

Urban Combat Scenario in Kyiv

Radio Communication: "Enemy forces reported occupying government buildings in the city center, with snipers on rooftops."

FireFly™ Recommendation: "Cross-reference the address with the city's operational plans to identify key strategic points and access routes for friendly forces. Advise deploying sniper units to counter enemy snipers and using UAVs for real-time surveillance. Direct assault teams to use underground passageways for covert movement and coordinate with armored units for a pincer movement."

Humanitarian Aid Distribution Amidst Conflict

Radio Communication: "Shortage of essential supplies in residential districts, urgent need for food and medical aid."

FireFly™ Recommendation: "Access district layout and population data to prioritize distribution points for essential supplies. Coordinate with international aid organizations to ensure safe delivery of food, water, and medical aid. Deploy security units to protect aid workers and maintain order."

Response to Artillery Strikes

Radio Communication: "Heavy artillery strikes reported in the Obolon district, multiple casualties and infrastructural damage."

FireFly™ Recommendation: "Deploy emergency response teams to the affected area for immediate medical assistance. Use drone surveillance to assess the extent of damage and locate survivors. Recommend setting up temporary shelters and coordinating with engineering units for rapid repair of critical infrastructure."

Evacuation During Hostilities

Radio Communication: "Intense fighting near residential areas, civilians need evacuation."

FireFly™ Recommendation: "Utilize city maps to identify safe evacuation routes and temporary shelters. Deploy armored vehicles to escort civilians and provide cover, Coordinate with medical units for triage and immediate care. Use public announcements and social media to inform residents of evacuation points."

Cyber and Electronic Warfare Response

Radio Communication: "Suspected cyber attack on the city's power grid, widespread outages reported.'

FireFly™ Recommendation: "Activate cybersecurity protocols to isolate and neutralize the threat. Deploy IT and engineering teams to restore power and assess the damage. Coordinate with national cybersecurity agencies to enhance defenses and prevent further attacks. Inform the public about expected restoration times and safety measures."

By focusing on the specific landscapes, infrastructure, and community characteristics of these cities in Gaza and Ukraine, GovGPT FireFly™ can provide precise and actionable recommendations that enhance the effectiveness of incident response and management efforts within these diverse and challenging environments.

An ad-hoc decentralized, secure edge mesh network formed from situationally interconnected devices on persons (e.g., soldiers equipped with radios and/or wearable generative artificial intelligence based body-worn devices), nearby tactical vehicles, and/or drones communicatively and each other in response to an incident can be used, according to one embodiment. The ad-hoc network can be formed across these edge devices associated with a dispatch center 112 and/or deployment to an incident by central command, such as the forward operating base 120. This enables a highly integrated and responsive localized edge node peer-to-peer network system, enhancing situational awareness and operational effectiveness in the field, while improving network security and resiliency.

In addition, it will be appreciated that the various operations, processes and methods disclosed herein may be embodied in a non-transitory machine-readable medium and/or a machine-accessible medium compatible with a data processing system. Accordingly, the specification and drawings are to be regarded in an illustrative rather than a restrictive sense.

Many embodiments have been described. Nevertheless, it will be understood that various modifications may be made without departing from the spirit and scope of the claimed invention. For example, the GovGPT™ headphone may be the GovGPT™ wearable headphone 100 in any form (e.g., including circumaural (over-ear), supra-aural (on-ear), earbud and in-ear form). Also, embodiments described for one use case, such as for law enforcement, may apply to any of the other use cases described herein in any form. In addition, the logic flows depicted in the Figures do not require the particular order shown, or sequential order, to achieve desirable results. In addition, other steps may be provided, or steps may be eliminated, from the described flows. Other components may be added or removed from the described systems. Accordingly, other embodiments are within the scope of the following claims.

It may be appreciated that the various systems, methods, and apparatus disclosed herein may be embodied in a machine-readable medium and/or a machine-accessible medium compatible with a data processing system (e.g., a computer system), and/or may be performed in any order.

The structures and modules in the Figures may be shown as distinct and communicating with only a few specific structures and not others. The structures may be merged with each other, may perform overlapping functions, and may communicate with other structures not shown to be connected in the Figures. Accordingly, the specification and/or drawings may be regarded in an illustrative rather than a restrictive sense.

In one embodiment, specialized processors are used for vision processing and sensors. For example, advanced AI vision processors designed by Ubicept (https://www.ubicept.com/). Ubicept's technology, which enhances computer vision by counting individual photons, can significantly enhance the DragonFly's capabilities, according to one embodiment. By integrating Ubicept's advanced imaging technology, the FireFly™ can offer unparalleled visual clarity in all lighting conditions, including extreme low light or high-contrast environments, according to one embodiment. This can enable more accurate threat detection and environmental analysis, according to one embodiment. The ability to capture sharp images in high-speed motion can improve the system's responsiveness in dynamic scenarios, according to one embodiment. Additionally, the technology's potential to see around corners can provide a strategic advantage in complex, urban combat zones or in reconnaissance missions, according to one embodiment. This integration can make the FireFly™ an even more powerful tool for military and law enforcement personnel, offering enhanced situational awareness and operational effectiveness, according to one embodiment.

In another embodiment, Ambarella's Oculii radar technology (https://www.oculii.com/), combined with 4D imaging radar, can significantly enhance the FireFly™. It can offer advanced angular resolution, LIDAR-like point cloud density, and long-range radar sensing, according to one embodiment. By dynamically adapting radar waves and reducing data size, it enables high-performance imaging radar systems, according to one embodiment. This technology can improve TactiGuard's detection capabilities in various environmental conditions, particularly in rain, snow, and fog, where visual systems might fail, according to one embodiment. The integration can lead to a more comprehensive sensing suite, combining camera, radar, and AI processing for a complete autonomous mobility solution, according to one embodiment.

For example, for training the FireFly™, the NVIDIA A100 Tensor Core GPU (https://www.nvidia.com/en-us/data-center/a100/) can be an optimal choice, according to one embodiment at the time of this patent application. It should be understood that future generations of AI specific chips might be preferred in years ahead. At the current time of this writing, the A100 offers significant acceleration for deep learning and machine learning tasks, making it ideal for processing the complex algorithms and vast data sets involved in training the FireFly™, according to one embodiment. The A100's advanced architecture provides enhanced computational power, enabling faster training times and more efficient handling of large neural networks, which are crucial for the sophisticated AI capabilities required in the FireFly™, according to one embodiment.

Using NVIDIA®'s A100 Tensor Core GPU to train the FireFly™ involves leveraging its powerful computational abilities for handling deep learning tasks, according to one embodiment. The A100's architecture (and future generations of similar or better computational chips) can be well-suited for processing large and complex neural networks, which are fundamental in the AI algorithms of TactiGuard™. Its high throughput and efficient handling of AI workloads can significantly reduce training times, enabling rapid iteration and refinement of models, according to one embodiment. This can be particularly useful in developing the sophisticated pattern recognition, threat detection, and decision-making capabilities of the TactiGuard™ system, according to one embodiment. Through its advanced AI acceleration capabilities, the A100 can effectively manage the voluminous and diverse datasets that FireFly™ can require for comprehensive training at this time, according to one embodiment.

To train the FireFly™ using NVIDIA's A100 Tensor Core GPU, GovGPT™ intends to follow these steps, according to one embodiment:

Data Collection: Gather extensive datasets that include various scenarios TactiGuard™ might encounter, like different environmental conditions, human behaviors, and potential threats, according to one embodiment.

Data Preprocessing: Clean and organize the data, ensuring it's in a format suitable for training AI models, according to one embodiment. This might include labeling images, segmenting video sequences, or categorizing different types of sensory inputs, according to one embodiment.

Model Selection: Choose appropriate machine learning models for tasks such as image recognition, threat detection, or decision-making, according to one embodiment.

Model Training: Use the A100 GPU to train the models on the collected data, according to one embodiment. This involves feeding the data into the models and using algorithms to adjust the model parameters for accurate predictions or classifications, according to one embodiment.

Evaluation and Testing: Regularly evaluate the models against a set of test data to check their accuracy and reliability, according to one embodiment. Make adjustments to the model as needed based on performance, according to one embodiment.

Optimization: Fine-tune the models for optimal performance, according to one embodiment. This includes adjusting hyperparameters and potentially retraining the models with additional or refined data, according to one embodiment.

Integration: Once the models are adequately trained and optimized, integrate them into the TactiGuard™ system's software framework, according to one embodiment.

Real-World Testing: Deploy the system in controlled real-world scenarios to test its effectiveness and make any necessary adjustments based on its performance, according to one embodiment.

Continuous Learning: Implement a mechanism for continuous learning, allowing the system to adapt and improve over time based on new data and experiences, according to one embodiment. Throughout these steps, the power of the A100 GPU can be utilized to handle the heavy computational load, especially during the training and optimization phases, ensuring efficient and effective model development, according to one embodiment.

Apart from NVIDIA's A100 GPU framework, emerging chipsets offer enhanced computational capabilities. For example, integrating SambaNova® technology (https://sambanova.ai/) into the FireFly™ can offer significant benefits. Integrating SambaNova's SN40L and SambaNova® chips into the various embodiments can substantially enhance its AI capabilities, according to one embodiment. With the SN40L's ability to handle a 5 trillion parameter model, significantly more than the GPT-4's 1.76 trillion parameters, the various embodiments can process and analyze more complex data at an unprecedented scale, according to one embodiment. This can enable more advanced pattern recognition, faster decision-making, and highly efficient real-time analysis in various operational environments, according to one embodiment. Additionally, the claim that SambaNova's technology can train large models six times faster than an Nvidia A100 suggests that the TactiGuard's AI models can be developed and updated much more rapidly, keeping the system at the forefront of AI advancements in security and defense, according to one embodiment.

In summary, this invention represents a significant advancement in military technology, offering enhanced situational awareness, real-time data processing, and secure communication, all essential for modern combat scenarios. By combining edge computing with a robust mesh network and advanced visual interpretation technologies, it equips warfighters with a powerful tool to navigate and understand their operational environment more effectively, making informed decisions rapidly in the field.

Although the present embodiments have been described with reference to specific example embodiments, it will be evident that various modifications and changes may be made to each of the embodiments in the Figures without departing from the broader spirit and scope of the various embodiments. For example, while the embodiment of a touchscreen display on a tablet carried by battalion commander 106, or inside a tactical vehicle 130 are described, but can alternatively be a heads up AR display similar to the Apple® Vision Pro.

Features in one embodiment and use case may be applicable to other use cases as described, and one with skill in the art will appreciate this and those interchanges are incorporated as embodiments of each use case—military, police, civilian, journalism, EMT etc.

In addition, the various devices and modules described herein may be enabled and operated using hardware circuitry (e.g., GPUs, CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., graphics processing units (GPUs), application-specific integrated (ASIC) circuitry and/or Digital Signal Processor (DSP) circuitry).

The invention claimed is:

1. A method comprising:

simultaneously listening to multiple communications surrounding a wearer;

amplifying a human speech detected in the multiple communications through a wearable microphone; and using an artificial intelligence model to generate a tactical recommendation to the wearer through a mobile device accessible to the wearer, wherein the artificial intelligence model to transcribe the human speech amplified through the wearable microphone, wherein an edge based compute module on a body of the wearer to run the artificial intelligence model, and wherein a transcription and an inference from the human speech through the artificial intelligence model is generated without need of an internet connection through the edge based compute module.

2. The method of claim 1:

wherein the tactical recommendation provided to the wearer is based on a global position system (GPS) location of the wearer.

3. The method of claim 1;

wherein the artificial intelligence model is stored on a local storage on the body of the wearer, and wherein the transcription is stored on the local storage on the body of the wearer.

4. The method of claim 1:

wherein the transcription and the inference from the human speech is optionally securely communicated through the internet connection to an aggregation server.

5. The method of claim 4:

wherein the aggregation server to perform aggregate inference operations on numerous transcriptions collected from a plurality of wearers across a distributed area, and wherein the aggregation server to capture the global position system (GPS) location of each wearer.

6. The method of claim 1 further comprising:

canceling non-speech noises from captured audio of the multiple communications through the wearable microphone;

determining a directionality of a source of the human speech surrounding the wearer;

assigning at least one of a radio and a speaker to the human speech based on the directionality; and separating speech waveforms to segregate unique speakers among the sources of the human speech.

7. The method of claim 1 further comprising:

recommending the tactical recommendation through the mobile device by using the human speech as an inference input data to the artificial intelligence model.

8. The method of claim 1 wherein the artificial intelligence model is a Wearer Assistant Artificial-Intelligence Model ("WAAIM") trained on optimal tactical responses given a particular operational scenario, wherein the operational scenario is at least one of a law enforcement scenario and a military scenario.

9. The method of claim 8 wherein captured audio is an input to the WAAIM and is provided from at least one of a dispatch center, a tactical vehicle, an informant, a drone, and an observational camera in the area of at least one of a law enforcement operation and a military operation.

10. The method of claim 1 wherein multiple communications are trusted radio communications from at least one of a squad soldier, a company commander, the dispatch center, a forward operating base, and a command center.

11. The method of claim 1 further comprising:

analyzing a video feed from an unmanned aerial vehicle encompassing an area of at least one of the law enforcement operation and the military operation;

applying a computer vision algorithm to the video feed from the unmanned aerial vehicle to identify a risk associated with operational objectives in at least one of the law enforcement operation and the military operation; and modifying an incident action plan based on the identification of the risk associated with operational objectives in the area of at least one of the law enforcement operation and the military operation.

12. The method of claim 1 further comprising:

generating a next action recommendation associated with the tactical recommendation; and displaying the tactical recommendation along with the next action recommendation on the mobile device accessible to the wearer.

13. The method of claim 1 further comprising: fine-tuning a large language model based on at least one of an operational plan data, a policy data, a procedure data, a historical response data, and an emergency operation plan data associated with a rule of engagement.

14. A wearable microphone, comprising:
a set of directional microphones in an array within the wearable microphone to:
simultaneously listen to multiple communications surrounding a wearer;
amplify a human speech detected in the multiple communications through the wearable microphone;
cancel non-speech noises from the captured audio of the multiple communications through the wearable microphone;
determine a directionality of a source of the human speech surrounding the wearer;
separate speech waveforms to segregate unique speakers among the sources of the human speech; and
provide a tactical recommendation to the wearer through a mobile device accessible to the wearer when the multiple communications are interpreted by an artificial intelligence model,
wherein the artificial intelligence model to transcribe the human speech amplified through the wearable microphone,
wherein an edge based compute module on a body of the wearer to run the artificial intelligence model, and
wherein a transcription and an inference from the human speech through the artificial intelligence model is generated without need of an internet connection through the edge based compute module.

15. The wearable microphone of claim 14:
wherein the tactical recommendation provided to the wearer is based on a global position system (GPS) location of the wearer.

16. The wearable microphone of claim 14:
wherein a video feed from an unmanned aerial vehicle encompassing an area of at least one of a law enforcement operation and a military operation is analyzed;
wherein a computer vision algorithm is applied to the video feed from the unmanned aerial vehicle to identify a risk associated with operational objectives in at least one of the law enforcement operation and the military operation; and
wherein an incident action plan is modified based on the identification of the risk associated with operational objectives in the area of at least one of the law enforcement operation and the military operation.

17. A system comprising:
a wearable microphone to cancel non-speech noises from captured audio while simultaneously amplifying a human speech captured by the wearable microphone;
an edge based compute module on a body of a wearer to transcribe the human speech captured through the wearable microphone; and
an artificial intelligence model operating on the edge based compute module to generate a tactical recommendation accessible to the wearer,
wherein a transcription and an inference from the human speech through the artificial intelligence model is generated without need of an internet connection through the edge based compute module.

18. The system of claim 17:
wherein the transcription and the inference from the human speech is securely communicated through an internet connection to an aggregation server, and
wherein the aggregation server to perform aggregate inference operations on numerous transcriptions collected from a plurality of wearers across a distributed area, and wherein the aggregation server to capture a global position system (GPS) location of each wearer.

* * * * *